United States Patent [19]
Yamaya et al.

[11] Patent Number: 6,114,440
[45] Date of Patent: Sep. 5, 2000

[54] SILICONE RESIN-CONTAINING EMULSION COMPOSITION, METHOD FOR MAKING SAME, AND ARTICLE HAVING A CURED FILM OF SAME

[75] Inventors: Masaaki Yamaya; Hiroaki Kizaki; Masahiro Furuya; Akira Yamamoto, all of Usui-gun, Japan

[73] Assignee: Shin-Etsu Chemical Co., Ltd., Japan

[21] Appl. No.: 09/332,124

[22] Filed: Jun. 14, 1999

Related U.S. Application Data

[62] Division of application No. 08/965,491, Nov. 6, 1997, Pat. No. 5,973,068.

[30] Foreign Application Priority Data

| Nov. 7, 1996 | [JP] | Japan | 8-311430 |
| Aug. 4, 1997 | [JP] | Japan | 9-221999 |
| Aug. 4, 1997 | [JP] | Japan | 9-222000 |

[51] Int. Cl.⁷ ............... C08L 83/06; B32B 9/04; B05D 3/02
[52] U.S. Cl. ............ 524/865; 524/506; 524/866; 427/387; 428/446
[58] Field of Search ............ 524/506, 588, 524/862, 865, 860, 866; 528/32, 33; 427/387; 428/446

[56] References Cited

U.S. PATENT DOCUMENTS

| 4,552,910 | 11/1985 | Deubzer et al. . |
| 4,648,904 | 3/1987 | DePasquale et al. . |
| 4,999,249 | 3/1991 | Deschler et al. . |
| 5,051,463 | 9/1991 | Yukimoto et al. ............... 524/865 |
| 5,281,657 | 1/1994 | Mautner et al. . |
| 5,405,691 | 4/1995 | Noda et al. . |
| 5,508,657 | 4/1996 | Yamazaki et al. . |
| 5,618,879 | 4/1997 | Cavivenc et al. . |
| 5,844,060 | 12/1998 | Furuya et al. . |
| 5,889,109 | 3/1999 | Knies et al. ............... 524/860 |

FOREIGN PATENT DOCUMENTS

| 0 757 059 A1 | 5/1997 | European Pat. Off. . |
| 58-213046 | 12/1983 | Japan . |
| 61-9463 | 1/1986 | Japan . |
| 62-197369 | 9/1987 | Japan . |
| 3-45628 | 2/1991 | Japan . |
| 3-115485 | 5/1991 | Japan . |
| 3-200793 | 9/1991 | Japan . |
| 5-209149 | 8/1993 | Japan . |
| 6-344665 | 12/1994 | Japan . |
| 7-196750 | 8/1995 | Japan . |
| 7-247434 | 9/1995 | Japan . |
| 8-27347 | 1/1996 | Japan . |
| 8-3409 | 1/1996 | Japan . |
| 8-60098 | 3/1996 | Japan . |

*Primary Examiner*—Tae Yoon
*Attorney, Agent, or Firm*—Millen, White, Zelano & Branigan, P.C.

[57] ABSTRACT

A silicone resin-containing emulsion composition is prepared by emulsion polymerizing a solution containing a water-insoluble silanol group-bearing silicone resin and a radical polymerizable vinyl monomer and substantially free of an organic solvent. The emulsion may further contain a film-forming assistant having a boiling point of at least 100° C. and soluble or uniformly dispersible in water. The emulsion can be coated and cured into a film having mar resistance, weather resistance, and chemical resistance.

17 Claims, No Drawings

SILICONE RESIN-CONTAINING EMULSION COMPOSITION, METHOD FOR MAKING SAME, AND ARTICLE HAVING A CURED FILM OF SAME

This is a division of application Ser. No. 08/965,491 filed Nov. 6, 1997, now U.S. Pat. No. 5,973,068.

BACKGROUND OF THE INVENTION

1. Field of the Invention

This invention relates to a silicone resin-containing emulsion composition having film formability and capable of forming a cured film having mar resistance, weather resistance, and chemical resistance, a method for preparing the composition, and an article having a cured film of the composition.

2. Prior Art

From the contemporary concern about the environmental pollution and the standpoint of a safe working environment, the switch of dispersing media from organic solvents to aqueous systems is required in the paint and coating field.

In compliance with this requirement, coating emulsions obtained by emulsion polymerizing radical polymerizable vinyl monomers, as typified by acrylic resin systems, have been widely used as the base component of coating compositions because they have good film formability and chemical resistance. Such coating compositions, however, suffer from the essential lack of water resistance and weather resistance.

On the other hand, silicone resins obtained by hydrolysis and condensation of silane compounds attract attention as coating compositions because they are capable of forming films having high hardness, weather resistance, water resistance, heat resistance and water repellency. Nevertheless, the silicone resins are not only inferior in film formability, alkali resistance, and film flexibility, but also lack shelf stability because silanol groups have high condensation activity. The silicone resins are generally used as solutions in organic solvents, which suffer from the hazards of potential fire and explosion, toxicity to the human body, and environmental pollution. It is desired to have a silicone resin composition of the emulsion type.

Various attempts as described below have been made to overcome the above-mentioned drawbacks although they are still unsatisfactory.

(a) An aqueous emulsion is obtained by emulsifying an alkoxysilane compound or a partial hydrolyzate/condensate thereof with the aid of various surfactants (see JP-A 213046/1983 corresponding to U.S. Pat. No. 4,552,910, JP-A 197369/1987 corresponding to U.S. Pat. No. 4,648,904, JP-A 115485/1991, and JP-A 200793/1991 corresponding to U.S. Pat. No. 4,999,249). A system obtained by mixing this emulsion with another emulsion resulting from emulsion polymerization of a polymerizable vinyl monomer is also known from JP-A 344665/1994.

(b) An aqueous emulsion is obtained by forcibly mechanically pulverizing and dispersing a solventless solid silicone resin together with a chain-like silicon compound (see JP-A 247434/1995).

(c) An emulsion is prepared by emulsion polymerizing a radical polymerizable vinyl monomer in the presence of a water-soluble polymer resulting from hydrolysis of an alkoxysilane in water in the absence of a surfactant (see JP-A 60098/1996).

(d) A solid particle emulsion of graft copolymer is obtained by hydrolyzing and condensing an alkoxysilane mixture containing a vinyl polymerizable alkoxysilane into an aqueous emulsion containing a solid silicone resin, and adding a radical polymerizable vinyl monomer thereto, followed by emulsion polymerization (see JP-A 209149/1993 corresponding to U.S. Pat. No. 5,405,691 and JP-A 196750/1995).

(e) An emulsion is prepared by emulsion polymerizing a radical polymerizable vinyl monomer into an emulsion, adding an alkoxysilane to the emulsion, and effecting hydrolysis and condensation, thereby introducing a silicone resin into emulsion particles (see JP-A 45628/1991 and 3409/1996 corresponding to EP 757059A).

(f) An emulsion is prepared by emulsion-polymerizing an alkoxysilane containing a vinyl polymerizable functional group together with a radical polymerizable vinyl monomer (see JP-A 9463/1986 and 27347/1996).

In the case of (a), active alkoxy groups are prone to hydrolysis with the lapse of time, forming in the system an alcohol by-product which is an organic solvent. Another drawback is that a relatively low molecular weight polymeric reactant converts into a high molecular weight compound. As a result, the emulsion becomes unstable due to the alcohol by-product and varies in degree of polymerization. That is, the emulsion shows unstable performance. If a large amount of surfactant is used to compensate for such drawbacks, then the coating experiences a substantial drop of film properties including hardness and water resistance. Since the system consists of a silicone resin alone, the drawbacks inherent to the silicone resin are left unchanged. Therefore, film properties are far from satisfactory.

Method (b) is by forcibly emulsifying particles of a solid silicone resin having a softening point together with a chain-like organopolysiloxane terminated with an OH group at each end with the aid of a surfactant. This method has the advantage that no organic solvent is contained. Nevertheless, since the solid silicone resin due to its high polarity is difficultly soluble in a liquid organopolysiloxane of low polarity, the solid resin must be dispersed by means of a sand grinder mill. It is then difficult to divide the solid resin into fine particles, resulting in the disadvantage that the emulsion lacks stability. Also, since the solid resin has a relatively low silanol group content of 0.1 to 5% by weight, its curing requires a temperature as high as 200 to 300° C., which means inferior workability to the organic solvent system. Due to the combined use of chain-like organopolysiloxane, the cured coating is good in water repellency, but has low hardness leading to poor mar resistance. Thus the coating is not fully durable.

Method (c) is by first simply hydrolyzing an alkoxysilane in water to form a water-soluble resin which does not contain a surfactant, then adding a surfactant thereto, and emulsion polymerizing a radical polymerizable vinyl monomer therein. This method also has the drawback that hydrolysis in water produces an alcohol by-product. The water-soluble silicone resin is partially taken into emulsion particles although a substantial portion thereof is left in water because of its high water solubility. Active silanol groups contained in molecules which are present in water tend to gradually condense, precipitating as a gel-like matter. As a result, the emulsion becomes unstable. Also the silicone resin component and the vinyl polymerizable component are not uniformly distributed in the cured film since their mutual solubility is essentially poor. Then film properties become poor.

In the case of (d), an alkoxysilane is hydrolyzed in water and an emulsion of a corresponding solid silicone resin is then formed therefrom. Utilizing vinyl polymerizable groups contained in the silicone resin as starting points, acrylic chains are grafted by emulsion polymerization. This method also involves the hydrolysis step of an alkoxysilane, which introduces an alcohol or organic solvent into the system. The emulsion stability is thus insufficient. This method intends to produce solid fine particles capable of imparting lubricity and water repellency, and produces composite particles in which a silicone resin serving for these functions is positioned at the center of a nucleus and acrylic chains contributing to the prevention of agglomeration of particles in water and an improvement in dispersion are grafted thereto. It is therefore preferred that both the components are non-uniformly distributed, the silicone resin undergoes full crosslinking within particles, and the silicone resin is rather free of silanol groups and remains inactive. Consequently, it is not envisaged to form a cured film from the emulsion.

Like the foregoing emulsions, the emulsion (e) has the drawbacks that since an alkoxysilane is post added to an emulsion of vinyl monomer, an alcohol by-product forms and the alkoxysilane is not completely taken into emulsion particles. The stability of the emulsion and the characteristics of a cured film are far from satisfactory. Owing to the post addition of an alkoxysilane, there is a possibility that more silicone resin is present on the outer shell side. Both the components are non-uniform within particles and in cured film. The mutual compensation of both the resins is thus insufficient.

In emulsion (f), an alkoxysilane having a vinyl polymerizable functional group is emulsion polymerized together with a radical polymerizable vinyl monomer. The alkoxy groups are restrained from hydrolysis and left intact. This suppresses the formation of alcohol by-product and changes of characteristics with time as found in the foregoing emulsions. However, it is difficult to introduce a large amount of the silicone resin component into a coating. Thus, the coating is not improved in weather resistance to a satisfactory level for exterior application.

In summary, the prior art well-known methods have not succeeded in providing a silicone resin-containing emulsion having advantages including (i) the absence of highly flammable alcohols having a low boiling point and other organic solvents, (ii) good emulsion stability, (iii) low temperature curing, and (iv) formation of a uniform cured film having improved characteristics including mar resistance, weather resistance, and chemical resistance.

SUMMARY OF THE INVENTION

An object of the present invention is to provide a silicone resin-containing emulsion composition having the above-mentioned advantages (i) to (iv), a method for preparing the composition, and an article having a cured film of the composition.

We have found that by emulsion polymerizing a mixed solution of a silicone resin, preferably a silanol group-terminated silicone resin, of the average compositional formula (1) shown below and a radical polymerizable vinyl monomer as main components, there is obtained an emulsion which contains the condensation type silicone resin and the vinyl polymerized resin in common particles thereof, remains highly stable during shelf storage, and forms a film with good characteristics. We have also found that by adding a film-forming assistant having a boiling point of at least 100° C. and soluble or uniformly dispersible in water to the emulsion, the emulsion is further improved in film formability and thus forms a film with satisfactory characteristics. We have also found that by adding a compound containing a IA group and/or IIA group metal as a curing catalyst, the curability at a low temperature is improved and the emulsion composition can be cured even at room temperature.

In a first aspect, the present invention provides a silicone resin-containing emulsion composition comprising an emulsion polymerized product obtained from a solution containing (1) 100 parts by weight of a water-insoluble silanol group-bearing silicone resin of the following average compositional formula (1):

$$R^1_m R^2_n Si(OH)_p(OX)_q O_{(4-m-n-p-q)/2} \qquad (1)$$

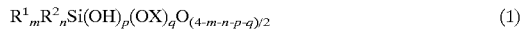

wherein $R^1$ is an unsubstituted monovalent hydrocarbon group, $R^2$ is a substituted monovalent hydrocarbon group, OX is a hydrolyzable group, letters m, n, p and q are numbers satisfying $0.5 \leq m \leq 1.8$, $0 \leq n \leq 1.0$, $0 \leq p \leq 1.5$, $0 \leq q \leq 0.5$, $0.5 \leq m+n \leq 1.8$, and $0 < p+q \leq 1.5$, and (2) 10 to 1,000 parts by weight of a radical polymerizable vinyl monomer as main components, said solution being substantially free of an organic solvent having a boiling point of less than 100° C., an organic solvent which is insoluble or not uniformly dispsersed in water, and an aromatic organic solvent.

The invention also provides a method for preparing a silicone resin-containing emulsion composition comprising the step of emulsion polymerizing a solution containing (1) 100 parts by weight of a water-insoluble silanol group-bearing silicone resin of the following average compositional formula (1):

$$R^1_m R^2_n Si(OH)_p(OX)_q O_{(4-m-n-p-q)/2} \qquad (1)$$

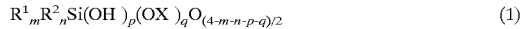

wherein $R^1$ is an unsubstituted monovalent hydrocarbon group, $R^2$ is a substituted monovalent hydrocarbon group, OX is a hydrolyzable group, letters m, n, p and q are numbers satisfying $0.5 \leq m \leq 1.8$, $0 \leq n \leq 1.0$, $0 \leq p \leq 1.5$, $0 \leq q \leq 0.5$, $0.5 \leq m+n \leq 1.8$, and $0 \leq p+q \leq 1.5$, and (2) 10 to 1,000 parts by weight of a radical polymerizable vinyl monomer as main components, said solution being substantially free of an organic solvent having a boiling point of less than 100° C., an organic solvent which is insoluble or not uniformly dispersed in water, and an aromatic organic solvent.

An article having formed thereon a cured film of the composition is also contemplated herein.

In a second aspect, the present invention provides a silicone resin-containing emulsion composition comprising (A) an emulsion polymerized product obtained from a solution containing (1) 100 parts by weight of a water-insoluble silanol group-bearing silicone resin of the following average compositional formula (1):

$$R^1_m R^2_n Si(OH)_p(OX)_q O_{(4-m-n-p-q)/2} \qquad (1)$$

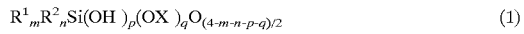

wherein $R^1$ is an unsubstituted monovalent hydrocarbon group, $R^2$ is a substituted monovalent hydrocarbon group, OX is a hydrolyzable group, letters m, n, p and q are numbers satisfying $0.5 \leq m \leq 1.8$, $0 \leq n \leq 1.0$, $0 \leq p \leq 1.5$, $0 \leq q \leq 0.5$, $0.5 \leq m+n \leq 1.8$, and $0 < p+q < 1.5$, and (2) 10 to 1,000 parts by weight of a radical polymerizable vinyl monomer as main components, and (B) a film-forming assistant having a boiling point of at least 100° C. and soluble or uniformly dispersible in water.

The invention also provides a method for preparing a silicone resin-containing emulsion composition comprising the steps of emulsion polymerizing a solution containing (1) 100 parts by weight of a water-insoluble silanol group-bearing silicone resin of the following average compositional formula (1):

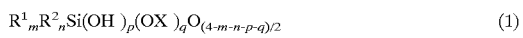
$$R^1{}_m R^2{}_n Si(OH)_p(OX)_q O_{(4-m-n-p-q)/2} \quad (1)$$

wherein $R^1$ is an unsubstituted monovalent hydrocarbon group, $R^2$ is a substituted monovalent hydrocarbon group, OX is a hydrolyzable group, letters m, n, p and q are numbers satisfying $0.5 \leq m \leq 1.8$, $0 \leq n \leq 1.0$, $0<p \leq 1.5$, $0 \leq q \leq 0.5$, $0.5 \leq m+n<1.8$, and $0<p+q \leq 1.5$, and (2) 10 to 1,000 parts by weight of a radical polymerizable vinyl monomer as main components, and adding to the emulsion polymerized solution a film-forming assistant having a boiling point of at least 100° C. and soluble or uniformly dispersible in water.

In one preferred embodiment, the method further includes the steps of removing an organic solvent from the silanol group-bearing silicone resin, adding the silanol group-bearing silicone resin and the film-forming assistant to the radical polymerizable vinyl monomer to form a solution of the silicone resin in the vinyl monomer, and emulsion polymerizing the solution in the presence of a surfactant.

In another preferred embodiment, the method comprises the steps of (i) hydrolyzing a hydrolyzable silane compound in water and condensation polymerizing the hydrolyzate to form a reaction mixture containing the water-insoluble silanol group-bearing silicone resin of the average compositional formula (1), (ii) removing hydrolyzed by-products from the reaction mixture, leaving a mixture consisting essentially of the silanol group-bearing silicone resin of formula (1) and water, (iii) adding the radical polymerizable vinyl monomer to the mixture consisting essentially of the silanol group-bearing silicone resin and water whereby the silicone resin is dissolved in the vinyl monomer, removing an aqueous layer, thereby leaving a solution of the silicone resin in the vinyl monomer, and adding a film-forming assistant having a boiling point of at least 100° C. and soluble or uniformly dispersible in water thereto, and (iv) emulsion polymerizing the vinyl monomer solution of the silicone resin in the presence of a surfactant.

In a further preferred embodiment, the method further comprises the steps of (i) hydrolyzing a hydrolyzable silane compound in water and condensation polymerizing the hydrolyzate to form a reaction mixture containing the water-insoluble silanol group-bearing silicone resin of the average compositional formula (1), (ii) removing hydrolyzed by-products from the reaction mixture, leaving a mixture consisting essentially of the silanol group-bearing silicone resin of formula (1) and water, (iii) adding the radical polymerizable vinyl monomer to the mixture consisting essentially of the silanol group-bearing silicone resin and water whereby the silicone resin is dissolved in the vinyl monomer, removing an aqueous layer, thereby leaving a solution of the silicone resin in the vinyl monomer, (iv) emulsion polymerizing the vinyl monomer solution of the silicone resin in the presence of a surfactant, and (v) adding to the emulsion polymerized solution a film-forming assistant having a boiling point of at least 100° C. and soluble or uniformly dispersible in water.

An article having formed thereon a cured film of the composition is also contemplated herein.

In a third aspect, the present invention provides a silicone resin-containing emulsion composition comprising (A) an emulsion polymerized product obtained from a solution containing (1) 100 parts by weight of a water-insoluble silanol group-bearing silicone resin of the following average compositional formula (1):

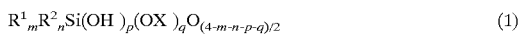
$$R^1{}_m R^2{}_n Si(OH)_p(OX)_q O_{(4-m-n-p-q)/2} \quad (1)$$

wherein $R^1$ is an unsubstituted monovalent hydrocarbon group, $R^2$ is a substituted monovalent hydrocarbon group, OX is a hydrolyzable group, letters m, n, p and q are numbers satisfying $0.5 \leq m \leq 1.8$, $0 \leq n \leq 1.0$, $0<p \leq 1.5$, $0 \leq q \leq 0.5$, $0.5 \leq m+n \leq 1.8$, and $0<p+q \leq 1.5$, and (2) 10 to 1,000 parts by weight of a radical polymerizable vinyl monomer as main components, and (C) a compound containing a IA group and/or IIA group metal.

An article having formed thereon a cured film of the composition is also contemplated herein. A method of preparing such an article comprising the steps of: forming a film of the composition on a substrate and then curing the film at room temperature is also provided.

The emulsion composition of the invention has the following advantages which have never been achieved by the prior art methods.

(i) Both the resins form an interpenetrating network (IPN) within emulsion particles to complement the shortages of the resins each alone. The emulsion has good film formability and forms a uniform cured film having satisfactory characteristics including mar resistance, weather resistance and chemical resistance.

(ii) In emulsion particles, both the polymers are intertwined in a solventless state to impose a limit on the degree of freedom of silanol groups having high condensation activity. As a consequence, even a system having a high silanol group content has good shelf stability because the condensation of silanol groups is retarded. Since the silicone resin used is water insoluble, the silicone resin is completely taken into particles. Then the stability of the emulsion is maintained at a satisfactory level.

(iii) Inversely, the confinement of silanol groups within particles keeps their high curing activity intact. Consequently, the emulsion is well curable even at relatively low temperatures.

(iv) Since the emulsion is substantially free of an organic solvent having a boiling point of less than 100° C., an organic solvent which is insoluble or not uniformly dispsersed in water, and an aromatic organic solvent, or contains only a minor amount of a film-forming assistant, a film of quality is obtained upon drying and curing. The working environment is kept safe since no harmful solvents evaporate. Also the emulsion is kept stable since it contains no low-boiling alcohol components which can promote the breakage of the emulsion.

Particularly when a film-forming assistant having a boiling point of at least 100° C. and soluble or uniformly dispersible in water is blended in the emulsion polymerized product of a silicone resin of formula (1) and a radical polymerizable vinyl monomer, the resulting emulsion is substantially free of low boiling organic solvents having a boiling point of lower than 100° C. (e.g., methanol), water-insoluble organic solvents and aromatic organic solvents (e.g., toluene), contains the condensation type silicone resin and the vinyl polymerized resin within common particles thereof, and has good shelf stability and satisfactory film characteristics.

When a compound containing a IA group and/or IIA group metal is blended, the resulting composition can be cured even at room temperature or low temperatures.

Owing to these advantages, the silicone resin-containing emulsion composition of the invention is suitable as exterior coating compositions to be applied to structures and building members and also applicable in the area where conventional acrylic emulsions and acrylic/silicone resins are applied.

DETAILED DESCRIPTION OF THE INVENTION

First described is the silanol group-bearing silicone resin used as a first component to form the emulsion according to the present invention. The silicone resin is of the following average compositional formula (1).

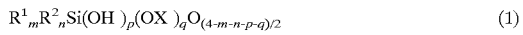

$$R^1_m R^2_n Si(OH)_p(OX)_q O_{(4-m-n-p-q)/2} \qquad (1)$$

Herein, $R^1$ is an unsubstituted monovalent hydrocarbon group, preferably those having 1 to 10 carbon atoms, for example, alkyl groups such as methyl, ethyl, propyl, isopropyl, butyl, t-butyl, hexyl, cyclohexyl, octyl and decyl, alkenyl groups such as vinyl, allyl, 5-hexenyl, and 9-decenyl, and aryl groups such as phenyl. Preferred among others are methyl, propyl, hexyl and phenyl. Methyl is selected especially when weather resistance is required. Long-chain alkyl groups are selected especially when water repellency is required. Phenyl is selected especially when flexibility should be imparted to a coating. Preferably, the content of methyl in total organic substituent groups ($R^1 + R^2$) is at least 80 mol %.

$R^2$ is a substituted monovalent hydrocarbon group. The substituted monovalent hydrocarbon groups are substituted ones of the above-mentioned unsubstituted monovalent hydrocarbon groups of 1 to 10 carbon atoms wherein some or all of the hydrogen atoms are replaced by substituents. Exemplary substituents include (i) halogen atoms such as fluorine and chlorine, (ii) epoxy functional groups such as glycidyloxy and epoxycyclohexyl, (iii) (meth)acryl functional groups such as methacryl and acryl, (iv) amino functional groups such as amino, aminoethylamino, phenylamino, and dibutylamino, (v) sulfur-containing functional groups such as mercapto and tetrasulfide, (vi) alkyl ether functional groups such as (polyoxyalkylene)alkyl ether, (vii) anionic groups such as carboxyl and sulfonyl, and (viii) quaternary ammonium salt structure-containing groups. Examples of the substituted monovalent hydrocarbon group include trifluoropropyl, perfluorobutylethyl, perfluorooctylethyl, 3-chloropropyl, 2-(chloromethylphenyl)ethyl, 3-glycidyloxypropyl, 2-(3,4-epoxycyclohexyl)ethyl, 5,6-epoxy-hexyl, 9,10-epoxydecyl, 3-(meth)acryloxypropyl, (meth)acryl-oxymethyl, 11-(meth)acryloxyundecyl, 3-aminopropyl, N-(2-aminoethyl)aminopropyl, 3-(N-phenylamino)propyl, 3-dibutyl-aminopropyl, 3-mercaptopropyl, 2-(4-mercaptomethylphenyl)-ethyl, polyoxyethylenoxypropyl, 3-hydroxycarbonylpropyl, and 3-tributylammoniumpropyl. Epoxy, amino, and mercapto functional groups may be used when it is desired to enhance the adhesion to substrates. (Meth)acryl functional groups capable of radical copolymerization and mercapto functional groups having the function of a chain transfer agent may be used when it is desired to form a close block of the silicone resin with a vinyl polymer. When an attempt is made to crosslink the silicone resin with a vinyl polymer via a bond other than a siloxane bond, it is recommended to introduce a functional group capable of reacting with an organic functional group in the vinyl polymer, for example, epoxy groups (for reaction with hydroxy, amino and carboxy groups) and amino groups (for reaction with epoxy and acid anhydride groups).

The OX group is a hydrolyzable group while X is a monovalent hydrocarbon group such as alkyl having 1 to 6 carbon atoms, alkenyl, and aryl. Examples of the hydrolyzable group represented by OX include methoxy, ethoxy, propoxy, isopropoxy, butoxy, sec-butoxy, t-butoxy, isopropenoxy, and phenoxy groups. For hydrolysis and condensation reactivity and stability in emulsion, the use of methoxy, ethoxy and isopropoxy is preferred.

Letters m, n, p and q are numbers satisfying $0.5 \leq m \leq 1.8$, $0 \leq n \leq 1.0$, $0 \leq p \leq 1.5$, $0 < q \leq 0.5$, $0.5 \leq m+n \leq 1.8$, and $0 < p+q \leq 1.5$. With m<0.5, which means a too low content of $R^1$, the cured film is too hard and tends to crack. With m>1.8, which means a too large number of chain units, the cured film becomes rubbery and less mar resistant. More preferably, m is a number from 0.6 to 1.5. With n>1.0, which means a too high content of bulky $R^2$ group, the cured film fails to maintain hardness and becomes less weather resistant. $R^2$ need not be contained if it is unnecessary to impart the above-mentioned function of $R^2$ group. The optimum range of m+n is determined for the same reason as m. The silanol group is an essential component. If p representative of the content of silanol group exceeds 1.5, the silicone resin becomes unstable. In order to ensure good shelf stability and high curability, the preferred range of p is from 0.05 to 0.8, especially from 0.2 to 0.7. There may be present a crosslinkable hydrolyzable group OX in addition to the silanol group, the content of group OX represented by q should be 0.5 or less. With q>0.5, the silicone resin is prone to hydrolysis in water to form an alcohol by-product which is an organic solvent in the system. The total number of crosslinkable substituent groups represented by (p+q) should be in the range: $0 < p+q \leq 1.5$. With p+q=0, no curing occurs. With p+q>1.5, undesirably the molecule becomes smaller and more water soluble.

In addition to the above-mentioned requirement, the silicone resin which is applicable in the practice of the invention should contain a silanol group and be insoluble in water alone. If the silicone resin is soluble in water, it cannot be fully incorporated in particles upon emulsion polymerization. Insofar as these requirements are met, the silicone resin may be prepared by any desired procedure. However, simply hydrolyzing a hydrolyzable silane compound in water is insufficient. Some illustrative procedures for preparing the silicone resin are described below.

The starting reactant from which the silicone resin is prepared may be any of silane compounds which have 1, 2, 3 or 4 hydrolyzable groups of the chloro or alkoxy type and an organic substituent group satisfying the above-mentioned requirement. Examples of the silane compound which can be used herein are silane coupling agents such as vinyltrichlorosilane, vinyltrimethoxysilane, vinyltriethoxysilane, vinylmethyldichlorosilane, vinylmethyldimethoxysilane, vinylmethyldiethoxysilane, 5-hexenyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-(meth) acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-vinylphenyltrimethoxysilane, 3-(4-vinylphenyl)propyltrimethoxysilane, 4-vinylphenylmethyltrimethoxysilane, 3-aminopropyltrimethoxysilane, 3-aminopropyltriethoxysilane, 3-aminopropylmethyldimethoxysilane, 3-aminopropylmethyl-diethoxysilane, 3-(2-aminoethyl)aminopropyltrimethoxysilane, 3-mercaptopropyltrimethoxysilane, 3-mercaptopropyltriethoxy-silane, 3-mercaptopropylmethyldimethoxysilane, and 3-mercaptopropylmethyldiethoxysilane. Other useful silane compounds are tetrachlorosilane, tetramethoxysilane, tetraethoxysilane, tetrabutoxysilane, methyltrichlorosilane, methyltrimethoxysilane, methyltriethoxysilane, methyltriisopropoxysilane, methyltributoxysilane, methyltriisopropenoxysilane, dimethyldichlorosilane, dimethyldimethoxysilane, dimethyldiethoxysilane, dimethyldiisopropoxysilane, dimethyldibutoxysilane, dimethyldiisopropenoxysilane, trimethylchlorosilane, trimethylmethoxysilane, trimethylethoxysilane, trimethylisopropenoxy-silane, ethyltrichlorosilane, ethyltrimethoxysilane, propyl-trichlorosilane, butyltrichlorosilane, butyltrimethoxy-silane, hexyltrichlorosilane, hexyltrimethoxysilane, decyltrichlorosilane, decyltrimethoxysilane, phenyltrichlorosilane, phenyltrimethoxysilane, cyclohexyltrichlorosilane, cyclohexyltrimethoxysilane, propylmethyldichlorosilane, propylmethyldimethoxysilane, hexylmethyldichlorosilane, hexylmethyldimethoxysilane, phenylmethyldichlorosilane, phenylmethyldimethoxysilane, diphenyldichlorosilane, diphenyldimethoxysilane, dimethylphenylchlorosilane, and partial hydrolyzates thereof. Inter alia, methoxysilanes and ethoxysilanes are preferred because of the ease of operation and distillation of by-products. The organic silicon compound which can be used herein is not limited to the foregoing examples. A mixture of two or more of these silane compounds is also useful.

The following two procedures may be used in hydrolyzing the hydrolyzable silane compounds to produce the silicone resin which can be used in the practice of the invention. A first procedure is to hydrolyze silane compounds in organic solvents. The organic solvents include aromatic hydrocarbon solvents such as toluene and xylene, hydrocarbon solvents such as hexane and octane, ketone compounds such as methyl ethyl ketone and methyl isobutyl ketone, ester compounds such as ethyl acetate and isobutyl acetate, and alcohols such as methanol, ethanol, isopropanol, butanol, isobutanol, and t-butanol. The first procedure requires the extra step of removing the organic solvent under atmospheric pressure or vacuum from the silicone resin product which is insoluble in water alone. The silicone resin product may be converted into a viscous liquid or solid by simply removing the organic solvent therefrom. Alternatively, the silicone resin is taken out as an organic solvent-free solution by adding to the silicone resin product a high boiling radical polymerizable vinyl monomer which is to be used in the subsequent step and distilling off the low boiling organic solvent in the co-presence of the vinyl monomer. A second procedure is to hydrolyze hydrolyzable silane compounds other than chlorosilanes in water. For the purpose of removing the organic solvent and at the same time, growing the silicone resin to a water-insoluble level, the hydrolyzed product is heated under atmospheric pressure or vacuum to distill off the organic solvent together with water. The distillation step yields a silicone resin having a high silanol group content which is free of the organic solvent and insoluble in water, in the form of a dispersion in water or as a precipitate separated and settled from water. Thereafter, the silicone resin may be separated from water and a radical polymerizable vinyl monomer be added to the silicone resin to form a solution thereof. Alternatively, a radical polymerizable vinyl monomer may be added to the aqueous solution of the silicone resin and the resultant vinyl monomer solution containing the silicone resin be separated.

Hydrolysis may be performed in the presence of a hydrolytic catalyst. The hydrolytic catalyst may be selected from prior art well-known catalysts, preferably those catalysts which form aqueous solutions exhibiting macidity of pH 2 to 7. Especially preferred are solid acids, for example, acidic halogenic acids, carboxylic acids, and sulfonic acids, acidic or weakly acidic inorganic salts, and ion exchange resins. Exemplary are hydrofluoric acid, hydrochloric acid, nitric acid, sulfuric acid, organic carboxylic acids such as acetic acid and maleic acid, methylsulfonic acid, and cation exchange resins having a sulfonic acid or carboxylic acid group at the surface. The amount of the hydrolytic catalyst used is preferably 0.001 to 10 mol % based on the moles of the hydrolyzable group on a silicon atom.

A second component for use to form the emulsion according to the invention is a radical polymerizable vinyl monomer. The radical polymerizable vinyl monomer may be selected from prior art well-known vinyl monomers which are radical polymerizable. Included are (a) alkyl (meth)acrylates whose alkyl group has 1 to 18 carbon atoms, such as methyl, ethyl, propyl, isopropyl, butyl, isobutyl, octyl, 2-ethylhexyl, lauryl, stearyl and cyclohexyl esters of acrylic acid and methacrylic acid; (b) vinyl monomers containing a carboxyl group or anhydride thereof such as acrylic acid, methacrylic acid and maleic anhydride; (c) hydroxyl group-containing vinyl monomers such as 2-hydroxy-ethyl (meth)acrylate and 2-hydroxypropyl (meth)acrylate; (d) amide group-containing vinyl monomers such as (meth)acrylamide, N-methylol (meth)acrylamide, N-methoxymethyl (meth)acrylamide, N-butoxymethyl (meth)acrylamide, and diacetone (meth)acrylamide; (e) amino group-containing vinyl monomers such as dimethylaminoethyl (meth)acrylate and diethylaminoethyl (meth)acrylate; (f) alkoxy group-containing vinyl monomers such as methoxyethyl (meth)-acrylate and butoxyethyl (meth)acrylate; (g) glycidyl group-containing vinyl monomers such as glycidyl (meth)acrylate and glycidyl allyl ether; (h) vinyl ester monomers such as vinyl acetate and vinyl propionate; (i) aromatic vinyl monomers such as styrene, vinyltoluene and α-methylstyrene; (j) vinyl cyanide monomers such as (meth)acrylonitrile; (k) vinyl halide monomers such as vinyl chloride and vinyl bromide; (l) vinyl monomers containing at least two radical polymerizable unsaturated groups in a molecule such as divinyl benzene, allyl (meth)acrylate, ethylene glycol di(meth)acrylate, diethylene glycol di(meth)acrylate, and trimethylolpropane tri(meth)acrylate; (m) (poly)oxyethylene chain-containing vinyl monomers such as (poly)oxyethylene mono(meth)acrylates having 1 to 100 ethylene oxide groups; (n) diorganopolysiloxanes having a radical polymerizable functional group at one end and containing 1 to 200 siloxane units such as dimethylpolysiloxane having a (meth)acryloxy-propyl group at one end and dimethylpolysiloxane having a styryl or α-methylstyryl group at one end; and (o) silane compounds having a radical polymerizable functional group such as vinyltrimethoxysilane, vinyltriethoxysilane, vinylmethyldimethoxysilane, vinylmethyldiethoxysilane, 5-hexenyl-trimethoxysilane, 3-(meth)

acryloxypropyltrimethoxysilane, 3-(meth) acryloxypropyltriethoxysilane, 3-(meth)acryloxypropylmethyldimethoxysilane, 3-(meth) acryloxypropylmethyl-diethoxysilane, 4-vinylphenyltrimethoxysilane, 3-(4-vinyl-phenyl) propyltrimethoxysilane, and 4-vinylphenylmethyltrimethoxysilane. These vinyl monomers may be used alone or in admixture of two or more.

Preferably, an alkyl (meth)acrylate having an alkyl group of 1 to 18 carbon atoms accounts for 1 to 100 mol % of the radical polymerizable vinyl monomer. If the alkyl (meth) acrylate content is less than 1 mol %, chemical resistance and other properties would sometimes be lost. An alkyl (meth)acrylate content of 30 to 99 mol % is more preferred. When it is desired to impart solvent resistance or chemical resistance to the cured film, a radical polymerizable vinyl monomer having a crosslinkable functional group is preferably copolymerized. Inter alia, the silane compounds of class (o) having a radical polymerizable functional group are preferred because they can form a siloxane linkage through condensation reaction. Also the glycidyl group-containing vinyl monomers of class (g) such as glycidyl (meth)acrylate and glycidyl allyl ether are preferred because they have an epoxy functional group which is crosslinkable through ring-opening reaction between carboxylic acid and epoxy group. The silane compounds of class (o) are more appropriate in the system of the to invention because the other component is a silicone resin having a silanol group. The silane compounds which can be used herein are preferably hydrolyzable silanes having a vinyl polymerizable functional group represented by the following general formula (2).

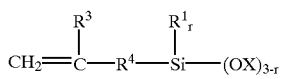

(2)

wherein $R^1$ and X are as defined above, $R^3$ is hydrogen or methyl, $R^4$ is a divalent organic group such as alkylene, arylene and alkylene arylene groups which may have an intervening —COO— group, and letter r is equal to 0, 1 or 2.

Examples of the group represented by $R^4$ are given below.

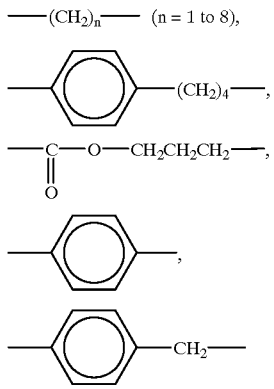

Preferably, the amount of the hydrolyzable silane having a vinyl polymerizable functional group used is 0.01 to 10 mol %, especially 0.1 to 5 mol % of the radical polymerizable vinyl monomer. Outside this range, a lower amount would fail to impart satisfactory solvent resistance and chemical resistance whereas a larger amount would undesirably induce excessive crosslinking, causing the film to crack.

When it is desired to impart lubricity to the film surface, the diorganopolysiloxanes of class (n) having a radical polymerizable functional group at one end are preferably copolymerized.

With respect to the mixing ratio, 10 to 1,000 parts by weight of the radical polymerizable vinyl monomer as the second component is used per 100 parts by weight of the silicone resin as the first component. With less than 10 parts of the vinyl monomer, film formability and chemical resistance would be insufficient. With more than 1,000 parts of the vinyl monomer, weather resistance and water resistance would be insufficient. Preferably, 30 to 500 parts by weight of the radical polymerizable vinyl monomer is used per 100 parts by weight of the silicone resin.

The emulsion composition of the invention is comprised of an emulsion polymerization product of the silicone resin and the radical polymerizable vinyl monomer. The emulsion composition is substantially free of high flammable organic solvents having a boiling point of less than 100° C., organic solvents which are insoluble or not dispersible in water, and aromatic organic solvents which are harmful for human bodies. Such organic solvents include alcohols such as methanol, ethanol, propanol, isopropanol, and t-butanol; aromatics such as toluene and xylene; ketones such as acetone, and methyl ethyl ketone; esters such as ethyl acetate, butyl acetate, and isobutyl acetate; ethers such as diethyl ether, and tetrahydrofuran; and acetonitrile, though not limited thereto. Since these solvents cause environmental pollution, are toxic to the human body, impair emulsion stability, and prevent the formation of a uniform film after coating, it is preferred that the emulsion is free of an organic solvent having a boiling point of less than 100° C., an organic solvent which is insoluble or not uniformly dispsersed in water, and an aromatic organic solvent.

Nevertheless, as previously mentioned, prior art well-known methods pertaining to composite emulsions of silicone resin and acrylic resin could not form an emulsion substantially free of an organic solvent. This is because a silicone resin having a highly reactive silanol group at a molecular end in a low molecular weight form is soluble in water, but is unstable and varies with time in the absence of an organic solvent and in a high molecular weight form is fairly stable, but insoluble in water and likely to solidify in the absence of an organic solvent, and thus difficult to form an emulsion. It is thus a common practice in the prior art to use organic solvents or to use alkoxysilane compounds or partial hydrolyzates thereof as the starting reactant.

According to the invention, an emulsion substantially free of an organic solvent can be obtained by hydrolyzing and polycondensing a hydrolyzable silane compound to such an extent that the resulting silicone resin is insoluble in water alone, removing organic solvents including alcohol by-products formed upon hydrolysis from the silicone resin solution as much as possible, converting the silicone resin solution into a solution of the silicone resin in a radical polymerizable vinyl monomer, and subjecting the last-mentioned solution to emulsion polymerization. Therefore, the emulsion of the invention can contain an unremovable trace amount of the organic solvent.

The amount of the organic solvent left in the emulsion should preferably be 0 to 5% by weight, especially 0 to 2% by weight of the total weight of the first and second components in order to overcome the above-mentioned problems.

In the second aspect of the invention, the emulsion obtained from the water-insoluble silanol group-bearing silicone resin and the radical polymerizable vinyl monomer further contains a film-forming assistant having a boiling point of at least 100° C. and soluble or uniformly dispersible in water as a third component. The film-forming assistant is left in the coating even after the majority of water is evaporated off and imparts flow to the coating until it is fully cured, thereby repairing the coating which is roughened by the evaporation of water, that is, imparting uniformity to the film. The film-forming assistant is effective particularly when the acrylic polymer produced has a high glass transition temperature. Also, to obtain a satisfactory film, the non-reactive film-forming assistant should be eventually extinguished from the cured film. In this regard, the film-forming assistant should be free of a hydroxyl group capable of bonding to a silicon atom through ester exchange reaction. Then the film-forming assistant is typically an organic solvent having a boiling point of at least 100° C., preferably 100° C. to 250° C., more preferably 100° C. to 200° C. A film-forming assistant having too high a boiling point would be left in the coating. Illustrative, non-limiting examples of the organic solvent used herein include alcohols such as 1-butanol, isobutyl alcohol, 2-pentanol, 3-pentanol, isopentyl alcohol, methyl lactate, ethyl lactate, and 3-methyl-3-methoxybutanol; polyols such as 1,2-propane diol, 1,3-butane diol, 1,4-butane diol, 2,3-butane diol, 1,5-pentane diol, 2-methyl-2,4-pentane diol, glycerin, and trimethylol propane; ethylene glycol derivatives such as 2-butoxyethanol, 2-phenoxyethanol, 2-ethoxyethyl acetate, 2-butoxyethyl acetate, and diethylene glycol monobutyl ether acetate; propylene glycol derivatives such as 1-methoxy-2-propanol, 1-ethoxy-2-propanol, 1-methoxy-2-methylethyl acetate, 1-ethoxy-2-methylethyl acetate, dipropylene glycol, dipropylene glycol monomethyl ether, dipropylene glycol monoethyl ether, and dipropylene glycol monomethyl ether acetate; 3-butylene glycol derivatives such as 3-methoxybutyl acetate; ketones such as cyclohexanone; and esters such as butyl acetate, isobutyl acetate, γ-butyrolactone, propylene carbonate, and dibutyl phthalate. Of these, alkylene glycol derivatives such as 2-ethoxyethyl acetate, 2-butoxyethyl acetate, diethylene glycol monobutyl ether acetate, 1-ethoxy-2-methylethyl acetate, and dipropylene glycol monomethyl ether acetate are preferred in view of leveling. These organic solvents do not deprive the emulsion of stability and contribute to only the formation of a uniform film because they are less water soluble than low-boiling alcohols such as methanol and ethanol. Those solvents having a boiling point of higher than 100° C., but not uniformly dispersible in water such as toluene and xylene do not provide the advantages of the invention and rather adversely affect the film. Also, aromatic organic solvents are not preferable because of their harmful effects on a human body. The film-forming assistant may be added to either the vinyl monomer solution prior to emulsion polymerization or the emulsion subsequent to emulsion polymerization, with equivalent results. The film-forming assistant is preferably added in an amount of 5 to 20 parts, especially 6 to 20 parts by weight per 100 parts by weight of the silanol group-bearing silicone resin and the radical polymerizable vinyl monomer combined. Less than 5 parts of the film-forming assistant would be insufficient to level the coating so that the cured film might not exert a satisfactory protective function. If more than 20 parts of the film-forming assistant is added, a higher amount of the film-forming assistant can be left in the coating at the end of curing to adversely affect the coating. The preferred amount of the film-forming assistant added is 6 to 20 parts, especially 6 to 15 parts by weight per 100 parts by weight of the silanol group-bearing silicone resin and the radical polymerizable vinyl monomer combined.

The emulsion composition of the invention can be prepared by emulsion polymerizing a solution which contains the water-insoluble silanol group-bearing silicone resin and the radical polymerizable vinyl monomer as main components and which is substantially free of an organic solvent having a boiling point of less than 100° C., an organic solvent which is insoluble or not uniformly dispsersed in water, and an aromatic organic solvent in the sense that the amount of organic solvent is limited to the above-defined range.

Upon emulsion polymerization, a surfactant is preferably used. The surfactant which can be used herein includes well-known nonionic, cationic, and anionic surfactants and reactive emulsifiers having a functional group capable of radical polymerization. Examples of the surfactant include nonionic surfactants such as polyoxy-ethylene alkyl ethers, polyoxyethylene alkyl phenyl ethers, polyoxyethylene carboxylates, sorbitan fatty acid esters, and polyoxyethylene sorbitan fatty acid esters; cationic surfactants such as alkyltrimethylammonium chloride and alkylbenzylammonium chloride; anionic surfactants such as alkyl or alkylallyl sulfates, alkyl or alkylallyl sulfonates, and dialkyl sulfosuccinates; ampholytic surfactants such as amino acid and betain type surfactants; and various reactive surfactants having a hydrophilic group such as sulfonic acid salt, polyoxyethylene chain and quaternary ammonium salt, including radical polymerizable derivatives of (meth) acrylates, styrene, and maleates.

These surfactants are illustrated below.

(1) 

$R^1, R^2$: H, CH$_3$
$R^3$: C$_{7-21}$ alkyl, alkenyl
M: alkali metal, ammonium
(see JP-A 144317/1979)

(2) 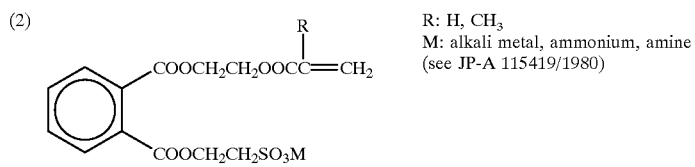

R: H, CH$_3$
M: alkali metal, ammonium, amine
(see JP-A 115419/1980)

-continued

| | | |
|---|---|---|
| (3) | $$CH_2=\overset{R}{\underset{|}{C}}COO(AO)_nSO_3M$$ | R: H, CH$_3$<br>A: alkylene<br>n: integer of 2 or more<br>M: mono or divalent cation<br>(see JP-A 34947/1987) |
| (4) | $$CH_2=\overset{R^1}{\underset{|}{C}}CH_2(AO)_nOOC\underset{\underset{R^2OOCCH_2}{|}}{C}HSO_3M$$ | R$^1$: H, CH$_3$<br>R$^2$: substituted or unsubstituted hydrocarbon, etc.<br>A: substituted or unsubstituted C$_{2-4}$ alkylene<br>n: 0 or positive number<br>(see JP-A 46291/1974) |
| (5) | $$CH_2=\overset{R^1}{\underset{|}{C}}CH_2OCH_2\overset{OH}{\underset{|}{C}}HCH_2OOC\underset{\underset{R^2(AO)_nOOCH_2}{|}}{C}HSO_3M$$ | R$^1$: H, CH$_3$<br>R$^2$: substituted or unsubstituted hydrocarbon, amino, etc.<br>A: C$_{2-4}$ alkylene<br>n: 0–100<br>(M: mono or divalent cation)<br>(see JP-A 203960/1983) |
| (6) | 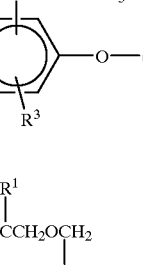 | R$^1$: C$_{6-18}$ alkyl, etc.<br>R$^2$: H, C$_{6-18}$ alkyl etc.<br>R$^3$: H, propenyl<br>A: substituted or unsubstituted C$_{2-4}$ alkylene<br>M: alkali metal, etc.<br>n: 1–200<br>(see JP-A 53802/1992) |
| (7) | $$CH_2=\overset{R^1}{\underset{|}{C}}CH_2OCH_2\\ \underset{|}{C}HO(AO)_lSO_3M\\ \underset{}{C}H_2O(AO)_mR^2$$ | R$^1$: H, CH$_3$<br>R$^1$: C$_{8-24}$ hydrocarbon, etc.<br>A: C$_{2-4}$ alkylene<br>M: H, alkali metal, alkaline earth metal<br>l: 0–20<br>m: 0–50<br>(see JP-A 104802/1987) |
| (8) | $$\underset{\underset{CHCOOR}{\parallel}}{C}HCOOCH_2\overset{OH}{\underset{|}{C}}HCH_2SO_3M$$ | R: C$_{8-22}$ hydrocarbon, etc.<br>M: alkali metal, ammonium<br>(see JP-A 40388/1974) |
| (9) | $$CH_2=CCOOCH_2\overset{OH}{\underset{|}{C}}HCH_2SO_3M\\ \underset{|}{C}H_2COOR$$ | R: C$_{8-22}$ hydrocarbon, etc.<br>M: alkali metal, ammonium<br>(see JP-A 40388/1974) |
| (10) | $$\underset{\underset{CHCOOM}{\parallel}}{C}HCOO(AO)_mR$$ | R: alkyl alkylphenyl<br>A: ethylene<br>M: ammonium, amine, alkali metal<br>m: 9, 12, 14, 28 (Examples)<br>(see JP-A 134658/1977) |
| (11) | $$CH_2=\overset{R^1}{\underset{|}{C}}CO(OCH_2CH_2)_nOR^2$$ | R$^1$: H, CH$_3$<br>R$^2$: H, CH$_3$, —C$_6$H$_4$—(CH$_2$)$_m$—H<br>n: 4–30<br>(see JP-A 126093/1978) |
| (12) | $$CH_2=\overset{R^1}{\underset{|}{C}}COO(C_2H_4)_x(\overset{CH_3}{\underset{|}{C}}HCH_2O)_y(C_2H_4O)_zR^2$$ | R$^1$,R$^2$: H, CH$_3$<br>x: 0–100<br>y: 0–100<br>z: 0–100<br>1 ≦ x + y + z ≦ 100<br>(see JP-A 28208/1981) |
| (13) | 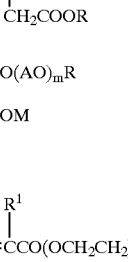 | R$^1$: C$_{6-18}$ alkyl etc.<br>R$^2$: H, C$_{6-18}$ alkyl etc.<br>R$^3$: H, propenyl<br>A: substituted or unsubstituted C$_{2-4}$ alkylene<br>n: 1–200<br>(see JP-A 50204/1992) |

-continued (14)

$$CH_2=CCH_2OCH_2\underset{|}{\overset{R^1}{|}}$$
$$\phantom{CH_2=CCH_2OCH_2}CHO(AO)_lH$$
$$\phantom{CH_2=CCH_2OCH_2}CH_2O(AO)_mR^2$$

$R^1$: H, $CH_3$
$R^2$: $C_{6-24}$ hydrocarbon, acyl
A: $C_{2-4}$ alkylene
l: 0–100
m: 0–50
(see JP-A 104802/1987)

(15)

$$CH_2=CCOO(A^1O)_mR^1$$
$$\phantom{CH_2=C}|$$
$$\phantom{CH_2=C}(CH_2)_lCOO(A^2O)_nR^2$$

$R^1$, $R^2$: H, $C_{1-24}$ hydrocarbon, acyl
$A^1$, $A^2$: substituted or unsubstituted $C_{2-4}$ alkylene
l: 1, 2
m, n: 0, positive number
m + n ≧ 3
m + n ≧ 1 when $R^1 = R^2 = H$
(see JP-A 98484/1975)

The surfactants may be used alone or in admixture of two or more. Preferably the surfactant is used in an amount of 0.5 to 15% by weight, especially 1 to 10% by weight based on the first and second components (effective components) combined.

A radical polymerization initiator may be used upon emulsion polymerization. Examples of the radical polymerization initiator include persulfates such as potassium persulfate and ammonium persulfate; water-soluble initiators such as aqueous hydrogen peroxide, t-butyl-hydroperoxide, t-butylperoxymaleic acid, succinic acid peroxide, and 2,2'-azobis-(2-N-benzylamidino)propane hydrochloride; oil-soluble initiators such as benzoyl peroxide, cumene hydroperoxide, dibutyl peroxide, diisopropyl peroxydicarbonate, cumyl peroxyneodecanoate, cumyl peroxyoctoate, and azoisobutyronitrile; and redox systems combined with a reducing agent such as acidic sodium sulfite, Rongalit, and ascorbic acid. The polymerization initiator may be used in an amount of 0.1 to 10%, especially 0.5 to 5% by weight based on the radical polymerizable vinyl monomer.

The method for preparing an emulsion according to the invention is described in further detail. The following two embodiments are preferred.

In the first preferred embodiment, the method of the invention includes the first step of distilling off an organic solvent from the solution of the silanol group-bearing silicone resin which is water insoluble alone, leaving essentially only the effective component; the second step of adding the silicone resin to the radical polymerizable vinyl monomer to dissolve the silicone resin in the vinyl monomer; and the third step of emulsion polymerizing the solution of the silicone resin in the vinyl monomer in the presence of a surfactant. The first step of distilling off an organic solvent is preferably carried out at as low a temperature as possible in order to maintain the highly active silanol groups intact. Since the organic solvent is once separated, this embodiment is appropriate when a silicone resin having a relatively low silanol group content and relatively high stability is used. If desired, the organic solvent is distilled off from the silicone resin solution in the co-presence of a relatively high boiling radical polymerizable vinyl monomer, thereby substituting the radical polymerizable vinyl monomer for the solvent, which is known as the solvent exchange technique. The emulsion polymerization technique may be any of prior art well-known techniques, for example, a batchwise charging technique of emulsifying the silicone resin/vinyl monomer solution in its entirety followed by polymerization, and a monomer addition technique of polymerizing the silicone resin/vinyl monomer solution while continuously adding a solution or emulsion of radical polymerizable vinyl monomer. Also useful is a seed polymerization technique of previously polymerizing a part of the emulsified solution and continuing polymerization while adding the remainder of the emulsified emulsion. A core/shell polymerization technique of changing the monomer composition of core and shell is also applicable.

The solution containing the radical polymerizable vinyl monomer is preferably emulsified by adding the solution to an aqueous solution of a surfactant and emulsifying the mixture by means of a homomixer or high pressure homogenizer. Emulsion polymerization is generally completed within about 3 to 8 hours at a temperature of 10 to 90° C., preferably 30 to 80° C.

In the second preferred embodiment, the method of the invention includes the steps of (i) hydrolyzing a hydrolyzable silane compound in water and condensation polymerizing the hydrolyzate to form a reaction mixture containing a water-insoluble silanol group-bearing silicone resin of the average compositional formula (1); (ii) removing undesirable products resulting from hydrolysis, for example, alcohols or organic solvents and other hydrolyzed by-products, from the reaction mixture, leaving a mixture consisting essentially of the silanol group-bearing silicone resin of formula (1) and water; (iii) adding a radical polymerizable vinyl monomer to the mixture whereby the silicone resin which has been present dispersed or insoluble in an aqueous system is dissolved in the vinyl monomer, and removing an aqueous layer, thereby leaving a solution of the silicone resin in the vinyl monomer; and (iv) emulsion polymerizing the solution of the silicone resin in the vinyl monomer in the presence of a surfactant. This embodiment can retard the condensation of highly reactive silanol groups because the situation that the silicone resin is left alone during the process is avoided. This embodiment is thus suitable for a water-insoluble silicone resin having a relatively high silanol group content. The method starting from the silicone resin resulting from hydrolysis and condensation in water is advantageous because that silicone resin ensures high curability and yields a cured film having high hardness and flexibility as compared with the silicone resin of the same composition prepared in an organic solvent.

Where the film-forming assistant is added, it may be added to either the vinyl monomer solution or the emulsion after emulsion polymerization as previously mentioned.

The film-forming assistant is added to the vinyl monomer solution as follows. In the second step of the first embodiment, the film-forming assistant may be added to the vinyl monomer together with the silicone resin from which the organic solvent has been removed. In step (iii) of the second embodiment, the film-forming assistant may be added to the vinyl monomer solution of the silicone resin which has been separated from the aqueous layer.

Preferably, a compound containing a IA group and/or IIA group metal in the periodic table can be added as a curing catalyst to the emulsion composition. Examples of the compounds containing a IA group and/or IIA group metal as a curing catalyst include hydroxides such as lithium hydroxide, sodium hydroxide, potassium hydroxide, cesium hydroxide, magnesium hydroxide, calcium hydroxide and barium hydroxide; inorganic salts such as sodium carbonate, potassium carbonate, magnesium carbonate, calcium carbonate, sodium bicarbonate, potassium bicarbonate, lithium chloride, sodium chloride, potassium chloride, cesium chloride, magnesium chloride, calcium chloride, barium chloride, potassium fluoride, sodium fluoride, sodium sulfate, potassium sulfate, magnesium sulfate, calcium sulfate, sodium hydrogensulfate, potassium hydrogensulfate and sodium hexafluorosilicate; organic salts such as lithium formate, sodium formate, potassium formate, cesium formate, lithium acetate, sodium acetate, potassium acetate, cesium acetate, magnesium acetate, calcium acetate, barium acetate, sodium oxalate and potassium oxalate; alkoxides such as sodium methylate, potassium methylate and sodium ethylate; water-glass such as sodium silicate; and aqueous colloidal silica containing the IA group and/or IIA group metal such as sodium ions. They are used singly or in combination. The above curing catalysts should preferably be water-soluble.

Among them, preferred are inorganic salts, especially those containing Li, Na, K or Cs because of their excellent ability as a curing catalyst. Basic compounds such as sodium hydroxide, potassium hydroxide, sodium carbonate, potassium carbonate, sodium bicarbonate, potassium bicarbonate and water-glass are more preferable.

The curing catalyst is preferably added in an amount of 0.001 to 20 parts, especially 0.01 to 10 parts by weight per 100 parts by weight of the silanol group-bearing silicone resin and the radical polymerizable vinyl monomer combined. Less than 0.001 part of the curing catalyst would not fully exert the effect of the curing catalyst. If more than 20 parts of the curing catalyst is added, weather resistance, water resistance and appearance of the film may be lowered.

By adding the above curing catalyst containing a IA group and/or IIA group metal, the composition or film can be cured at 5 to 200° C., especially 10 to 150° C., although the curing temperature is preferably room temperature or low temperature in a range of 5 to 40° C., especially 10 to 30° C.

Although the emulsion composition of the invention is crosslinkable and curable at room temperature, if desired, another silanol condensation catalyst is added thereto on use in order to accelerate the curing rate or to achieve improved film characteristics. The curing catalyst for condensation may be selected from prior art well-known ones, for example, basic compounds such as n-hexylamine, tributylamine, and diazabicycloundecene; metal-containing compounds such as tetraisopropyl titanate, tetrabutyl titanate, aluminum triisobutoxide, aluminum triisopropoxide, aluminum acetylacetonate, aluminum perchlorate, aluminum chloride, cobalt octylate, cobalt acetylacetonate, zinc octylate, zinc acetylacetonate, iron acetylacetonate, tin acetylacetonate, dibutyltin dioctylate, dibutyltin dilaurate, and dibutyltin oxide; acidic compounds such as p-toluenesulfonic acid and trichloroacetic acid; and fluorides such as tetramethylammonium fluoride. The condensation catalyst may be used in an amount of 0.01 to 10 parts by weight per 100 parts by weight of the silicone resin.

When the compound containing a IA group and/or IIA group metal is not blended, the system is preferably adjusted at pH 3 to 9 in order to improve the stability of the emulsion. To this end, combinations of acidic and basic compounds serving as a buffer agent for pH adjustment may be added, for example, acetic acid combined with sodium acetate- and disodium hydrogen phosphate combined with citric acid. Below pH 3 or above pH 9, the surfactant used for emulsion polymerization would become unstable or silanol groups be likely to condense. More preferably, the system is adjusted at pH 4 to 8.

When the compound containing a IA group and/or IIA group metal is blended, the emulsion composition should preferably have a pH of 8 to 12. Out of the above pH range may lower the stability of the composition, resulting in a low curability and poor appearance of the film due to microgels.

Where the emulsion composition of the invention is used as a coating composition, it is preferred to further blend therein an extender pigment, coloring pigment or corrosion-preventing pigment in the form of inorganic particles because many characteristics including wear resistance, weather resistance, heat resistance, chemical resistance, high index of refraction, and antistatic property are improved. Exemplary pigments include extender and corrosion-preventing pigments such as cerium oxide, tin oxide, zirconium oxide, antimony oxide, rare earth oxide, titanium oxide, composite sol of these oxides, aluminum, clay, silica flour, diatomaceous earth, talc, mica, kaolin, barite, aluminum hydroxide, zinc hydroxide, aluminum oxide, aluminum silicate, aluminum phosphate, and silica sol, alumina sol, titania sol or zirconia sol dispersed in water or organic solvent such as alcohol, as well as those pigments surface treated with silane coupling agents; coloring pigments such as carbon black, graphite, ceramic black, zinc oxide, iron oxide, cadmium red, chromium oxide, cobalt green, Guignet's green, cobalt blue, Phthalocyanine Blue, Prussian blue, cadmium yellow, titanium yellow, and silver, as well as those pigments surface treated with silane coupling agents; and azo, azo-lake, phthalocyanine, quinacridone, and isoindolinone organic pigments. The pigment may be added in an amount of less than 900 parts, preferably less than 500 parts by weight per 100 parts by weight of the solids of the emulsion. A higher amount of the pigment undesirably deprives the emulsion of film formability and prevents the emulsion from forming a uniform coating.

Furthermore, a water-soluble or dispersible organic resin may be blended in the emulsion composition of the invention. The organic resin is used for the purpose of imparting flexibility, softness, adhesiveness, and chemical resistance to the cured coating. Exemplary organic resins include polyvinyl alcohol, water-soluble polyester resins, water-soluble or dispersible epoxy resins, water-soluble or dispersible acrylic resins, water-soluble or dispersible silicone-acrylic resins, and urethane resins. The organic resin may be blended in an amount of less than 50 parts by weight per 100 parts, preferably less than 30 parts by weight of the solids of the emulsion. A higher amount of the organic resin undesirably detracts from heat resistance, weather resistance, etc.

Moreover, any of various prior art well-known additives may be added to the emulsion composition of the invention for the purpose of imparting better film performance insofar as the characteristics of the composition are not adversely affected. Exemplary additives include curing agents (as previously mentioned), dispersants, plasticizers, antifoaming agents, thickeners, leveling agents (selected from silicone or fluorinated surfactants), preservatives, antibacterial agents, antioxidants, UV absorbers (e.g., benzophenone, triazole, phenyl salicylate, diphenyl acrylate, and acetophenone compounds), hindered amine photo-stabilizers, and extenders (e.g., aluminum paste and glass frit).

The emulsion composition of the invention is applied to a surface of a transparent or opaque substrate to be protected, for example, of metals, ceramics, glass, wood, papers, and plastics and then cured to form a cured film of the emulsion composition on the substrate surface, thereby imparting mar resistance, weather resistance, and chemical resistance to the substrate.

The coating or film may have any desired thickness although an appropriate thickness is 0.01 to 100 μm, especially 0.05 to 80 μm. The application technique used may be dipping, spraying, roll coating or brush coating, for example. The curing conditions include a temperature from room temperature to 200° C. and a time from 1 minute to 200 hours.

More particularly, owing to a high silicone resin content, the silicone resin-containing emulsion composition of the invention cures into a film having high hardness, flexibility, adhesion, weather resistance, and water repellency. The emulsion composition of the invention is thus suitable as undercoating agents in exterior building applications, paint as typified by top-coating agents, water repellent agents, and adhesives. Where the substrate is of metal, the emulsion composition of the invention is useful for the surface protection or undercoating treatment such as corrosion preventive coating of building structural members of iron and stainless steel and building sash members of aluminum, electrodeposition coating for automobiles and electric appliances, and surface protective coating of magnetic powder for use as an electrophotographic carrier. Where the substrate is plastic, the emulsion composition of the invention is useful for surface protective coating of plastic plates, magnetic or heat-sensitive recording film, packaging film, and vinyl cloth and as function-imparting binders. Where the substrate is wood or paper, the emulsion composition of the invention is useful for surface protective coating of ply wood, surface treatment of heat-sensitive recording paper, and water resistance-imparting coating applied to a printed surface. Owing to water repellency, the emulsion composition of the invention is useful for surface protective coating on synthetic leather and other fabrics. The emulsion composition of the invention is also applicable as a water-soluble binder for water resistant printing ink. Where the substrate is an inorganic material, the emulsion composition of the invention is useful for surface protective coating or as surface treating paint on external wall members of mortar, concrete, and cement, ceramic panels (including ALC plates, sizing boards, and gypsum boards), bricks, glass, porcelain, and synthetic marble. The emulsion composition of the invention is also applicable as a base polymer of adhesive. By adding another organic resin or silane coupling agent to the emulsion composition of the invention, there is obtained an adhesive which is effective for providing a bond between substrates of different materials.

There has been described a silicone resin-containing emulsion composition which is substantially free of low boiling or aromatic organic solvents, has good emulsion stability, film formability and low-temperature curability, and cures into a uniform film having improved mar resistance, weather resistance, and chemical resistance.

EXAMPLE

Examples of the invention are given below by way of illustration and not by way of limitation. All parts and percents are by weight.

Preparation Example 1

A 2-liter flask was charged with 408 g (3.0 mol) of methyltrimethoxysilane, and 786 g of water was then added thereto under a nitrogen atmosphere at 0° C. The contents were thoroughly mixed. Under ice cooling, 216 g of a 0.05N hydrochloric acid solution was added dropwise to the mixture over 40 minutes to effect hydrolysis. At the end of dropwise addition, the reaction mixture was agitated for one hour below 10° C. and for a further 2 hours at room temperature to complete hydrolysis.

Then, the methanol formed and water were distilled off at 70° C. under a vacuum of 60 Torr until no methanol was detected in the distillate. When the reaction solution was concentrated to 88% of the initial weight, no methanol was detected and at the same time, the solution turned white turbid. The solution was allowed to stand for one day whereupon it separated into two layers, that is, the silicone resin settled out.

A sample was taken out of the solution. The settled silicone resin was separated from water by dissolving it in methyl isobutyl ketone. After dewatering, the amount of silanol group was determined by reacting the silicone resin with a methyl Grignard reagent. The silanol content was 8.2% based on the silicone resin. On gel permeation chromatography (GPC), the silicone resin had a number average molecular weight of $1.8 \times 10^3$. An infrared absorption spectroscopy analysis showed that no methoxy group was left behind. From these analytical results, the silicone resin (A) obtained was regarded as being represented by the average compositional formula:

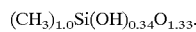

$(CH_3)_{1.0}Si(OH)_{0.34}O_{1.33}$.

This suggests that no organic solvent by-product would form from this silicone resin (A).

Next, 300 g (3 mol) of methyl methacrylate (MMA) was added to the above solution to dissolve the silicone resin precipitate therein whereby the MMA solution of the silicone resin was isolated from the water layer. There was collected 505 g of the MMA solution (A/MMA) having a nonvolatile content of 40.2% (105° C./3 hours).

Preparation Example 2

A silicone resin (B) was prepared by the same procedure as Preparation Example 1 except that a mixture of 388 g (2.85 mol) of methyltrimethoxysilane and 18 g (0.15 mol) of dimethyldimethoxysilane was used instead of 408 g (3.0 mol) of methyltrimethoxysilane. The silicone resin (B) obtained contained 8.0% of silanol group based on the silicone resin and had a number average molecular weight of $1.8 \times 10^3$ as measured by GPC. An IR absorption spectroscopy analysis showed that no methoxy group was left behind. From these analytical results, the silicone resin (B) was regarded as being represented by the average compositional formula:

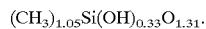

$(CH_3)_{1.05}Si(OH)_{0.33}O_{1.31}$.

This suggests that no organic solvent by-product would form from this silicone resin (B).

To the aqueous solution in which the silicone resin (B) had separated and settled out, 300 g (3 mol) of methyl methacrylate (MMA) was added to dissolve the silicone resin precipitate therein whereby the MMA solution of the silicone resin was isolated from the water layer. There was collected 507 g of the MMA solution (B/MMA) having a nonvolatile content of 40.1% (105° C./3 hours).

Preparation Example 3

A 2-liter flask was charged with 408 g (3.0 mol) of methyltrimethoxysilane and 300 g of toluene. With stirring at 40° C., 41 g of a 2.0% hydrochloric acid solution (3.23 mol of water) was added dropwise to the mixture over one hour to effect hydrolysis. With stirring continued, the reaction mixture was ripened for one hour at 40° C. Then the reaction mixture was subjected to a washing procedure including the steps of adding 100 g of a 10% sodium sulfate aqueous solution, stirring the mixture for 10 minutes, allowing the mixture to stand, and separating the aqueous layer. The washing procedure was repeated three times. From the thus obtained silicone resin solution, methanol and toluene were distilled off at 50° C. and 50 Torr. After filtration, there was collected a toluene solution of the silicone resin.

The silicone resin had a number average molecular weight of $2.0 \times 10^3$ as measured by GPC. A quantitative analysis of silanol group showed a silanol content of 4.2% based on the silicone resin. A quantitative analysis of methoxy group by cracking showed a methoxy content of 1.4% based on the silicone resin. From these analytical results, the silicone resin (C) obtained was regarded as being represented by the compositional formula:

$(CH_3)_{1.0}Si(OH)_{0.17}(OCH_3)_{0.03}O_{1.40}$.

This suggests that the amount of methanol by-product which could form from this silicone resin (C) is at most 1.4% based on the silicone resin.

The toluene was distilled off from the toluene solution under conditions of 50° C. and 10 Torr which would induce substantially no condensation reaction, thereby collecting the silicone resin in powder form. This powder silicone resin (C) had a volatile content of 0.3% (105° C./3 hours). Methyl methacrylate (MMA) was added to the powder silicone resin to form a MMA solution containing 70% of the silicone resin (C-1/MMA) and another MMA solution containing 40% of the silicone resin (C-2/MMA). Provided that the volatile matter of the powder consisted solely of an organic solvent, these solutions (C-1/MMA and C-2/MMA) contained at most 1.2% and 0.7% of the organic solvent, respectively.

Preparation Example 4

A silicone resin was prepared by the same procedure as Preparation Example 2 except that a mixture of 444.2 g (2.1 mol) of phenyltrichlorosilane and 159.8 g (0.9 mol) of propyltrichlorosilane was used instead of the methyltrimethoxysilane.

The silicone resin had a number average molecular weight of $1.8 \times 10^3$ as measured by GPC. A quantitative analysis of silanol group showed a silanol content of 5.1% based on the silicone resin. A quantitative analysis of methoxy group by cracking showed a methoxy content of 0.3% based on the silicone resin. From these analytical results, the silicone resin (D) obtained was regarded as being represented by the compositional formula:

$(C_6H_5)_{0.7}(C_3H_7)_{0.3}Si(OH)_{0.37}(OCH_3)_{0.01}O_{1.31}$.

This suggests that the amount of methanol by-product which could form from this silicone resin (D) is at most 0.3% based on the silicone resin.

The toluene was distilled off from the toluene solution under conditions of 50° C. and 10 Torr which would induce substantially no condensation reaction, thereby collecting the silicone resin in powder form. This powder silicone resin (D) had a volatile content of 0.5% (105° C./3 hours). Methyl methacrylate (MMA) was added to the powder silicone resin to form a MMA solution containing 70% of the silicone resin (D/MMA). Provided that the volatile matter of the powder consisted solely of an organic solvent, the solution (D/MMA) contained at most 0.7% of the organic solvent.

Preparation Example 5

A silicone resin was prepared by the same procedure as Preparation Example 1 except that a mixture of 326.4 g (2.4 mol) of methyltrimethoxysilane, 36 g (0.3 mol) of dimethyldimethoxysilane, and 70.8 g (0.3 mol) of 3-glycidoxypropyltrimethoxysilane was used instead of the methyltrimethoxysilane.

The silicone resin obtained had a number average molecular weight of $1.6 \times 10^3$ as measured by GPC. A quantitative analysis of silanol group showed a silanol content of 8.6% based on the silicone resin while no methoxy group was contained. From these analytical results, the silicone resin (E) was regarded as being represented by the compositional formula:

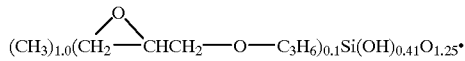

$(CH_3)_{1.0}(CH_2\overset{O}{\diagup\!\!\diagdown}CHCH_2\text{---}O\text{---}C_3H_6)_{0.1}Si(OH)_{0.41}O_{1.25}$.

This suggests that no organic solvent by-product would form from this silicone resin (E).

Methyl methacrylate (MMA) was added to the aqueous solution to dissolve the silicone resin precipitate therein whereby the MMA solution of the silicone resin was isolated from the water layer. The MMA solution (E/MMA) had a nonvolatile (=silicone resin) content of 40.1% (105° C./3 hours).

Preparation Example 6

A silicone resin was prepared by the same procedure as Preparation Example 1 except that a mixture of 326.4 g (2.4 mol) of methyltrimethoxysilane, 65.4 g (0.3 mol) of trifluoropropyltrimethoxysilane, and 74.4 g (0.3 mol) of 3-methacryloxypropylmethyldimethoxysilane was used instead of the methyltrimethoxysilane.

The silicone resin obtained had a number average molecular weight of $1.3 \times 10^3$ as measured by GPC. A quantitative analysis of silanol group showed a silanol content of 9.2% based on the silicone resin while no methoxy group was contained. From these analytical results, the silicone resin (F) was regarded as being represented by the compositional formula:

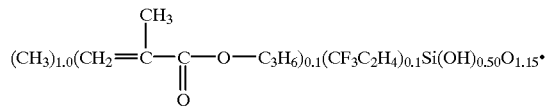

$(CH_3)_{1.0}(CH_2\!=\!\underset{\underset{O}{\|}}{\overset{CH_3}{\underset{|}{C}}}\!-\!C\!-\!O\!-\!C_3H_6)_{0.1}(CF_3C_2H_4)_{0.1}Si(OH)_{0.50}O_{1.15}$.

This suggests that no organic solvent by-product would form from this silicone resin (F).

A mixture of methyl methacrylate and butyl acrylate (MMA/BA=80/20) was added to the aqueous solution to dissolve the silicone resin precipitate therein whereby the MMA solution of the silicone resin was isolated from the water layer. The MMA solution (F/MMA-BA) contained 50.2% of silicone resin.

The foregoing results are shown in Table 1.

TABLE 1

| | Solution No. | | | | | | |
|---|---|---|---|---|---|---|---|
| | A | B | C-1 | C-2 | D | E | F |
| Silicone resin | | | | | | | |
| Organic group content (m) | 1.00 | 1.05 | 1.00 | 1.00 | 1.00 | 1.00 | 1.00 |
| Organic functional group content (n) | 0.00 | 0.00 | 0.00 | 0.00 | 0.00 | 0.10 | 0.20 |
| Type of functional group | — | — | — | — | — | epoxy | methacryl, fluorine |
| Silanol group content (p) | 0.34 | 0.33 | 0.17 | 0.17 | 0.37 | 0.41 | 0.50 |
| Hydrolyzable group content (q) | 0.00 | 0.00 | 0.03 | 0.03 | 0.01 | 0.00 | 0.00 |
| Radical polymerizable vinyl monomer (parts/100 parts of silicone resin) | | | | | | | |
| Methyl methacrylate | 150 | 150 | 43 | 150 | 43 | 150 | 80 |
| Butyl acrylate | — | — | — | — | — | — | 20 |
| Organic solvent inclusive of potential component (parts/100 parts of effective components) | 0.0 | 0.0 | 1.2 | 0.7 | 0.7 | 0.0 | 0.0 |

Example 1

A polymerizer equipped with a stirrer, condenser, thermometer, and nitrogen gas inlet was charged with 730 parts of deionized water, 0.47 part of sodium carbonate as a pH buffer, and 4.70 parts of boric acid, heated to 60° C. with stirring, and then purged with nitrogen. To the polymerizer, 1.75 parts of Rongalit, 0.12 part of a 1% aqueous solution of disodium ethylenediaminetetraacetate, and 0.04 part of a 1% aqueous solution of ferrous sulfate were added. At the same time, a mixture of 560 parts of a MMA solution of silicone resin, 140 parts of butyl acrylate, 2.1 parts of t-butylhydroperoxide (purity 69%), 14.0 parts of reactive surfactant Aquaron RN-20 (trade name, Daiichi Kogyo Seiyaku K.K.), and 7.0 parts of Aquaron HS-10 (trade name, Daiichi Kogyo Seiyaku K.K.) was uniformly added over 2½ hours while maintaining the polymerizer at a temperature of 60° C. Reaction was continued for a further 2 hours at 60° C. to complete polymerization. The thus obtained emulsion had a solid concentration of 50.1% and was adjusted to pH 7.0 by adding aqueous ammonia, if necessary.

Example 2

A polymerizer equipped with a stirrer, condenser, thermometer, and nitrogen gas inlet was charged with 300 parts of deionized water, 0.47 part of sodium carbonate as a pH buffer, and 4.7 parts of boric acid, heated to 60° C. with stirring, and then purged with nitrogen. Separately, 1,121 parts of an emulsified solution was obtained by adding a uniform mixture of 560 parts of a MMA solution of silicone resin, 70 parts of butyl acrylate, 35 parts of glycidyl methacrylate, 35 parts of 3-methacryloxypropyltrimethoxysilane, and 2.1 parts of t-butylhydroperoxide (purity 69%) to an aqueous solution containing 7.0 parts of sodium laurylsulfate and 14.0 parts of Noigen EA-170 (trade name, Daiichi Kogyo Seiyaku K.K.) in 400 parts of deionized water and emulsifying the mixture by means of a homomixer. To the polymerizer, 1.75 parts of Rongalit, 0.12 part of a 1% aqueous solution of disodium ethylenediaminetetraacetate, and 0.04 part of a 1% aqueous solution of ferrous sulfate were added. At the same time, 56 parts of the emulsified solution was added for effecting seed polymerization. Subsequently, the remainder of the emulsified solution was uniformly added over 3½ hours while maintaining the polymerizer at a temperature of 60° C. Reaction was continued for a further 2 hours at 60° C. to complete polymerization. The thus obtained emulsion had a solid concentration of 50.3% and pH 6.8.

Examples 3–9 and Comparative Examples 1–2

Emulsions were prepared by effecting emulsion polymerization as in Example 2, but using the blend composition shown in Tables 2 and 3.

Comparative Example 3

Emulsion polymerization was carried out as in Example 1 except that 336 parts of MMA was used instead of 560 parts of the MMA solution of silicone resin. At the end of emulsion polymerization, 435 parts of methyltrimethoxysilane (corresponding to 224 parts of an effective component provided that the same silicone resin as in Preparation Example 1 was formed) was post added to the emulsion, which was stirred and mixed for one hour at room temperature, obtaining an end emulsion composition.

Comparative Example 4

A polymerizer equipped with a stirrer, condenser, thermometer, and nitrogen gas inlet was charged with 730 parts of deionized water. With stirring, 435 parts of methyltrimethoxysilane was added dropwise over 10 minutes at room temperature. Stirring was continued for 3 hours at room temperature to effect hydrolysis. To the solution were added 0.47 part of sodium carbonate as a pH buffer and 4.70 parts of boric acid. The polymerizer was heated to 60° C. with stirring and then purged with nitrogen. To the polymerizer, 1.75 parts of Rongalit, 0.12 part of a 1% aqueous solution of disodium ethylenediaminetetraacetate, and 0.04 part of a 1% aqueous solution of ferrous sulfate were added. At the same time, a mixture of 336 parts of methyl methacrylate, 140 parts of butyl acrylate, 2.1 parts of t-butylhydroperoxide (purity 69%), 14.0 parts of reactive surfactant Aquaron RN-20 (trade name, Daiichi Kogyo Seiyaku K.K.), and 7.0 parts of Aquaron HS-10 (trade name, Daiichi Kogyo Seiyaku K.K.) was uniformly added over 2½ hours while maintaining the polymerizer at a temperature of 60° C. Reaction was continued for a further 2 hours at 60° C. to complete polymerization.

Comparative Example 5

Emulsion polymerization was carried out as in Example 1 except that a solution containing 435 parts of methyltrimethoxysilane (corresponding to 224 parts of an effective component provided that the same silicone resin as in Preparation Example 1 was formed as a result of hydrolysis) in 336 parts of MMA was used instead of 560 parts of the MMA solution of silicone resin, obtaining an end emulsion composition.

Cured coatings of the silicone resin-containing emulsions prepared in Examples 1–9 and Comparative Examples 1–5 were tested by the following procedure. Each of the compositions shown in Tables 2 and 3 was applied to a clean surface of a cold rolled steel sheet and cured under the conditions shown in Tables 2 and 3 to a cured thickness of 20 μm.

The cured coating was examined for (1) pencil hardness according to JIS K-5400, (2) adhesion by a cross-cut test using Cellophane® tape, (3) chemical resistance by dropping a 5% NaOH aqueous solution and a 3% sulfuric acid aqueous solution onto the coating, allowing the coating to stand for one day at room temperature, and observing any change of the coating, and (4) weather resistance after 3,000 hours of sunshine exposure by means of Sunshine Long-Life Weatherometer. With respect to (2) adhesion, a coating was rated 100/100 when all 100 sections were held bonded. With respect to (3) chemical resistance and (4) weather resistance, a coating was rated "○" when neither change nor coloring was observed, "Δ" when adhesion failure or some yellowing occurred, and "×" when separation or yellowing occurred.

The emulsion itself was examined for shelf stability by allowing it to stand for 30 days at 40° C. and observing the emulsion whether or not layer separation occurred or whether or not gel-like matter formed.

The results are also shown in Tables 2 and 3.

TABLE 2

| | Example | | | | | | | | |
|---|---|---|---|---|---|---|---|---|---|
| | 1 | 2 | 3 | 4 | 5 | 6 | 7 | 8 | 9 |
| Composition | | | | | | | | | |
| Silicone resin | | | | | | | | | |
| Type | A | C | B | C | D | E | F | A | F |
| Amount (pbw) | 224 | 392 | 224 | 224 | 392 | 224 | 280 | 350 | 105 |
| Vinyl monomer (pbw) | | | | | | | | | |
| Methyl methacrylate | 336 | 168 | 336 | 336 | 168 | 336 | 224 | 210 | 350 |
| Butyl acrylate | 140 | 140 | 140 | 70 | 70 | 70 | 70 | 70 | 70 |
| Glycidyl methacrylate | — | — | — | 35 | 35 | — | 35 | — | 70 |
| Hydroxyethyl acrylate | — | — | — | — | — | — | — | 35 | — |
| Acrylic acid | — | — | — | — | — | 35 | — | 35 | — |
| One end acryl-terminated dimethylsilicone oil | — | — | — | — | — | — | 35 | — | — |
| Styrene | — | — | — | — | — | 35 | — | — | 35 |
| 3-methacryloxypropylmethyl-dimethoxysilane | — | — | — | 35 | 35 | — | — | — | 70 |
| Total | 476 | 308 | 476 | 476 | 308 | 476 | 420 | 350 | 595 |
| Organic solvent (inclusive of potential component) (parts/100 parts of effective components) | 0.0 | 1.2 | 0.0 | 0.7 | 0.7 | 0.0 | 0.0 | 0.0 | 0.0 |
| Curing catalyst (pbw) (Na acetate, Al chelate) | — | 1 | — | 5 | 5 | — | — | — | — |
| Curing temp. (° C.) | 150 | 150 | 150 | 25 | 25 | 150 | 150 | 150 | 150 |
| Properties | | | | | | | | | |
| Pencil hardness | 3H | 3H | 3H | 2H | 4H | 3H | 2H | 2H | 3H |
| Adhesion | 100/100 | 100/100 | 100/100 | 100/100 | 100/100 | 100/100 | 100/100 | 100/100 | 100/100 |
| Weather resistance | ○ | ○ | ○ | ○ | ○ | ○ | ○ | ○ | ○ |
| Chemical resistance | ○ | ○ | ○ | ○ | ○ | ○ | ○ | ○ | ○ |
| Emulsion's shelf stability | ○ | ○ | ○ | ○ | ○ | ○ | ○ | ○ | ○ |

TABLE 3

| | Comparative Example | | | | |
|---|---|---|---|---|---|
| | 1 | 2 | 3 | 4 | 5 |
| Composition | | | | | |
| Silicone resin | | | | | |
| Type | A | A | silane | silane | silane |

TABLE 3-continued

|  | Comparative Example | | | | |
| --- | --- | --- | --- | --- | --- |
|  | 1 | 2 | 3 | 4 | 5 |
| Amount (pbw) | 650 | 50 | monomer 224 | monomer 224 | monomer 224 |
| Vinyl monomer (pbw) | | | | | |
| Methyl methacrylate | — | 510 | 336 | 336 | 336 |
| Butyl acrylate | 50 | 140 | 140 | 140 | 140 |
| Glycidyl methacrylate | — | — | — | — | — |
| Hydroxyethyl acrylate | — | — | — | — | — |
| Acrylic acid | — | — | — | — | — |
| One end acryl-terminated dimethylsilicone oil | — | — | — | — | — |
| Styrene | — | — | — | — | — |
| 3-methacryloxypropylmethyl-dimethoxysilane | — | — | — | — | — |
| Total | 50 | 650 | 476 | 476 | 476 |
| Organic solvent (inclusive of potential component) (parts/100 parts of effective components) | 1.2 | 0.1 | 43.9 | 43.9 | 43.9 |
| Curing catalyst (pbw) (Na acetate, Al chelate) | 5 | — | — | — | 5 |
| Curing temp. (° C.) | 150 | 150 | 150 | 150 | 25 |
| Properties | | | | | |
| Pencil hardness | 6H | 2B | 2H | H | F |
| Adhesion | 10/100 | 100/100 | 50/100 | 100/100 | 100/100 |
| Weather resistance | Δ | x | Δ | ○ | Δ |
| Chemical resistance | x | ○ | Δ | Δ | ○ |
| Emulsion's shelf stability | ○ | ○ | x | x | x |

Example 10

An exterior white paint composition was prepared by blending 100 parts of the silicone resin-containing emulsion prepared in Example 1 with 35 parts of titanium oxide pigment and dispersing them in a ball mill. The white paint composition was applied to a sealer-coated thick cement board, air dried, and cured for 5 minutes at 150° C. to a cured thickness of 20 μm. The cured coating had a pencil hardness of H. Separately, the white paint composition was spray coated to an aluminum substrate, air dried, and cured for 5 minutes at 150° C.

The two samples thus obtained were examined for weather resistance after 3,000 hours of sunshine exposure by means of Sunshine Weatherometer according to JIS K-5400. The white coatings remained substantially unchanged in color and appearance after the exposure test. That is, the coatings were fully weather resistant.

The samples were also examined for water resistance by a hot water immersion test (hot water, 60° C., 1 week) and a boiling water immersion test (boiling water, 5 hours). The coatings showed firm adhesion and no change of outer appearance and color.

Example 11

A coating composition was prepared by blending 100 parts of the silicone resin-containing emulsion prepared in Example 1 with 20 parts of a commercially available bisphenol A type epoxy resin emulsion (epoxy equivalent 900, effective component 55%). The coating composition was applied to a clean surface of a cold rolled steel sheet, air dried, and cured for 30 minutes at 150° C. to a cured thickness of 20 μm.

The cured coating was examined for pencil hardness according to JIS K-5400, chemical resistance by dropping a 5% NaOH aqueous solution and a 3% sulfuric acid aqueous solution onto the coating, allowing the coating to stand for one day at room temperature, and observing any change of the coating, and corrosion resistance by a salt spray test (200 hours) according to JIS K-5400. The cured coating showed a pencil hardness of 3H, high resistance against acid and alkali, firm adhesion, and good chemical resistance. The cured coating remained unchanged after the salt spray test.

Example 12

A polymerizer equipped with a stirrer, condenser, thermometer, and nitrogen gas inlet was charged with 730 parts of deionized water, 0.47 part of sodium carbonate as a pH buffer, and 4.70 parts of boric acid, heated to 60° C. with stirring, and then purged with nitrogen. To the polymerizer, 1.75 parts of Rongalit, 0.12 part of a 1% aqueous solution of disodium ethylenediaminetetraacetate, and 0.04 part of a 1% aqueous solution of ferrous sulfate were added. At the same time, a mixture of 560 parts of a MMA solution of silicone resin, 140 parts of butyl acrylate, 70 parts of 2-butoxyethyl acetate, 2.1 parts of t-butylhydroperoxide (purity 69%), 14.0 parts of reactive surfactant Aquaron RN-20 (trade name, Daiichi Kogyo Seiyaku K.K.), and 7.0 parts of Aquaron HS-10 (trade name, Daiichi Kogyo Seiyaku K.K.) was uniformly added over 2½ hours while maintaining the polymerizer at a temperature of 60° C. Reaction was continued for a further 2 hours at 60° C. to complete polymerization. The thus obtained emulsion had a solid concentration of 50.1% and was adjusted to pH 7.0 by adding aqueous ammonia, if necessary.

Example 13

A polymerizer equipped with a stirrer, condenser, thermometer, and nitrogen gas inlet was charged with 300 parts of deionized water, 0.47 part of sodium carbonate as a pH buffer, and 4.7 parts of boric acid, heated to 60° C. with stirring, and then purged with nitrogen. Separately, 1,121 parts of an emulsified solution was obtained by adding a uniform mixture of 560 parts of a MMA solution of silicone resin, 70 parts of butyl acrylate, 35 parts of glycidyl methacrylate, 35 parts of 3-methacryloxypropyltrimethoxysilane, and 2.1 parts of t-butylhydroperoxide (purity 69%) to an aqueous solution containing 7.0 parts of sodium laurylsulfate and 14.0 parts of Noigen EA-170 (trade name, Daiichi Kogyo Seiyaku K.K.) in 400 parts of deionized water and emulsifying the mixture by means of a homomixer. To the polymerizer, 1.75 parts of Rongalit, 0.12 part of a 1% aqueous solution of disodium ethylenediaminetetraacetate, and 0.04 part of a 1% aqueous solution of ferrous sulfate were added. At the same time, 56 parts of the emulsified solution was added for effecting seed polymerization. Subsequently, the remainder of the emulsified solution was uniformly added over 3½ hours while maintaining the polymerizer at a temperature of 60° C. Reaction was continued for a further 2 hours at 60° C. to complete polymerization. To the emulsion was added 42 parts of 1-ethoxy-2-methylethyl acetate. Stirring and mixing yielded an emulsion having a solid concentration of 50.3%.

Examples 14–20

Emulsions were prepared by effecting emulsion polymerization as in Example 13, but using the blend composition shown in Table 4.

Cured coatings of the silicone resin-containing emulsions prepared in Examples 12–20 were tested as in Examples 1–11. They were also examined for outer appearance. By a visual observation of a surface state, the coating was rated "⊚" for excellently uniform aesthetic appearance, "○" for uniform aesthetic appearance, "Δ" for a somewhat irregular surface, and "×" for an irregular surface.

The results are shown in Table 4.

TABLE 4

| | Example | | | | | | | | |
|---|---|---|---|---|---|---|---|---|---|
| | 12 | 13 | 14 | 15 | 16 | 17 | 18 | 19 | 20 |
| Composition | | | | | | | | | |
| Silicone resin | | | | | | | | | |
| Type | A | B | C | C | D | E | F | A | F |
| Amount (pbw) | 224 | 392 | 224 | 224 | 392 | 224 | 280 | 350 | 105 |
| Vinyl monomer (pbw) | | | | | | | | | |
| Methyl methacrylate | 336 | 168 | 336 | 336 | 168 | 336 | 224 | 210 | 350 |
| Butyl acrylate | 140 | 140 | 140 | 70 | 70 | 70 | 70 | 70 | 70 |
| Glycidyl methacrylate | — | — | — | 35 | 35 | — | 35 | — | 70 |
| Hydroxyethyl acrylate | — | — | — | — | — | — | — | 35 | — |
| Acrylic acid | — | — | — | — | — | 35 | — | 35 | — |
| One end acryl-terminated dimethylsilicone oil | — | — | — | — | — | — | 35 | — | — |
| Styrene | — | — | — | — | — | 35 | — | — | 35 |
| 3-methacryloxypropylmethyl-dimethoxysilane | — | — | — | 35 | 35 | — | — | — | 70 |
| Total | 476 | 308 | 476 | 476 | 308 | 476 | 420 | 350 | 595 |
| Film-forming assistant (pbw) | | | | | | | | | |
| 2-butoxyethyl acetate | 70 | — | 70 | 135 | 70 | 70 | — | — | 70 |
| 1-ethoxy-2-methylethyl acetate | — | 42 | — | — | — | — | 70 | 70 | — |
| Curing catalyst (pbw) (Na acetate, Al chelate) | — | 1 | — | 5 | 5 | — | — | — | — |
| Curing temp. (° C.) | 150 | 150 | 150 | 25 | 25 | 150 | 150 | 150 | 150 |
| Properties | | | | | | | | | |
| Pencil hardness | 4H | 3H | 3H | 3H | 4H | 3H | 3H | 2H | 3H |
| Adhesion | 100/100 | 100/100 | 100/100 | 100/100 | 100/100 | 100/100 | 100/100 | 100/100 | 100/100 |
| Weather resistance | ○ | ○ | ○ | ○ | ○ | ○ | ○ | ○ | ○ |
| Chemical resistance | ○ | ○ | ○ | ○ | ○ | ○ | ○ | ○ | ○ |
| Emulsion's shelf stability | ○ | ○ | ○ | ○ | ○ | ○ | ○ | ○ | ○ |
| Outer appearance | ○ | ⊚ | ⊚ | ⊚ | ⊚ | ⊚ | ⊚ | ⊚ | ⊚ |

Example 21

An exterior white paint composition was prepared by blending 100 parts of the silicone resin-containing emulsion prepared in Example 12 with 35 parts of titanium oxide pigment and dispersing them in a ball mill. The white paint composition was applied to a sealer-coated thick cement board, air dried, and cured for 5 minutes at 150° C. to a cured thickness of 20 μm. The cured coating had a pencil hardness of H. Also, the white paint composition was spray coated to an aluminum substrate, air dried, and cured for 5 minutes at 150° C.

The two samples thus obtained were examined for weather resistance after 3,000 hours of sunshine exposure by means of Sunshine Weatherometer according to JIS K-5400. The white coatings remained substantially unchanged in color and appearance after the exposure test. That is, the coatings were fully weather resistant.

The samples were also examined for water resistance by a hot water immersion test (hot water, 60° C., 1 week) and a boiling water immersion test (boiling water, 5 hours). The coatings showed firm adhesion and no change of outer appearance and color.

Example 22

A coating composition was prepared by blending 100 parts of the silicone resin-containing emulsion prepared in Example 12 with 20 parts of a commercially available bisphenol A type epoxy resin emulsion (epoxy equivalent 900, effective component 55%). The coating composition was applied to a clean surface of a cold rolled steel sheet, air dried, and cured for 30 minutes at 150° C. to a cured thickness of 20 μm.

The cured coating was examined for pencil hardness according to JIS K-5400, chemical resistance by dropping a 5% NaOH aqueous solution and a 3% sulfuric acid aqueous solution onto the coating, allowing the coating to stand for one day at room temperature, and observing any change of the coating, and corrosion resistance by a salt spray test (200 hours) according to JIS K-5400. The cured coating showed a pencil hardness of 3H, high resistance against acid and alkali, firm adhesion, and good chemical resistance. The cured coating remained unchanged after the salt spray test.

Example 23

To 1400 parts of the silicone resin-containing emulsion obtained by Example 1 was added 70 parts of 10% sodium bicarbonate aqueous solution. Then they were mixed and agitated at room temperature for 10 minutes to prepare an emulsion composition having a pH of 8.4.

Examples 24–26

Example 23 was repeated except that the curing catalysts shown in Tables 5 and 6 were used in amounts shown in Tables 5 and 6.

Examples 27–31

Silicone resin-containing emulsions were prepared by emulsion polymerizing the components shown in Tables 5 and 6 in the same manner as in Example 1. Then, Example 23 was repeated except that the thus obtained emulsions and the curing catalysts shown in Tables 5 and 6 were used.

Cured coatings of the resulting emulsion compositions were evaluated in the same procedure as described above. The results are shown in Tables 5 and 6.

TABLE 5

Curing condition: 120° C., 10 min.

| | Example | | | | | | | | |
|---|---|---|---|---|---|---|---|---|---|
| | 23 | 24 | 25 | 26 | 27 | 28 | 29 | 30 | 31 |
| Amount of silicone resin (pbw) | 224 | 224 | 224 | 224 | 650 | 50 | 224 | 224 | 224 |
| Vinyl monomer (pbw) | | | | | | | | | |
| Methyl methacrylate | 336 | 336 | 336 | 336 | — | 510 | 336 | 336 | 336 |
| Butyl acrylate | 140 | 140 | 140 | 140 | 50 | 140 | 140 | 133 | 133 |
| KBM-503 | — | — | — | — | — | — | — | 7 | — |
| KBM-502 | — | — | — | — | — | — | — | — | 7 |
| Total | 476 | 476 | 476 | 476 | 50 | 650 | 476 | 476 | 476 |
| Solid matter | 700 | 700 | 700 | 700 | 700 | 700 | 700 | 700 | 700 |
| Curing catalyst (pbw) | NaHCO$_3$ | NaHCO$_3$ | Na$_2$CO$_3$ | Na$_2$CO$_3$ | NaOH | KOH | AcONa | NaHCO$_3$ | NaHCO$_3$ |
| | 7 | 35 | 7 | 35 | 7 | 7 | 7 | 7 | 7 |
| pH of composition | 8.4 | 8.6 | 9.7 | 10.4 | 11.1 | 10.9 | 7.8 | 8.3 | 8.4 |
| Properties | | | | | | | | | |
| Appearance | ◯ | ◯ | ◯ | ◯ | ◯ | ◯ | ◯ | ◯ | ◯ |
| Pencil hardness | 2H | 2H | 2H | 2H | 2H | 2H | 2H | 2H | 2H |
| Adhesion | 100/100 | 100/100 | 100/100 | 100/100 | 100/100 | 100/100 | 100/100 | 100/100 | 100/100 |
| Weather resistance | ◯ | ◯ | ◯ | ◯ | ◯ | ◯ | Δ | ◯ | ◯ |
| Chemical resistance | ◯ | ◯ | ◯ | ◯ | ◯ | ◯ | ◯ | ◯ | ◯ |
| Solvent resistance | ◯ | ◯ | ◯ | ◯ | ◯ | ◯ | Δ | ◯ | ◯ |
| Emulsion's shelf stability | ◯ | ◯ | ◯ | ◯ | ◯ | ◯ | ◯ | ◯ | ◯ |

TABLE 6

Curing condition: room temperature, 10 days

| | Example | | | | | | | | |
|---|---|---|---|---|---|---|---|---|---|
| | 23 | 24 | 25 | 26 | 27 | 28 | 29 | 30 | 31 |
| Amount of silicone resin (pbw) | 224 | 224 | 224 | 224 | 650 | 50 | 224 | 224 | 224 |
| Vinyl monomer (pbw) | | | | | | | | | |
| Methyl methacrylate | 336 | 336 | 336 | 336 | — | 510 | 336 | 336 | 336 |

TABLE 6-continued

Curing condition: room temperature, 10 days

| | Example | | | | | | | | |
|---|---|---|---|---|---|---|---|---|---|
| | 23 | 24 | 25 | 26 | 27 | 28 | 29 | 30 | 31 |
| Butyl acrylate | 140 | 140 | 140 | 140 | 50 | 140 | 140 | 133 | 133 |
| KBM-503 | — | — | — | — | — | — | — | 7 | — |
| KBM-502 | — | — | — | — | — | — | — | — | 7 |
| Total | 476 | 476 | 476 | 476 | 50 | 650 | 476 | 476 | 476 |
| Solid matter | 700 | 700 | 700 | 700 | 700 | 700 | 700 | 700 | 700 |
| Curing catalyst (pbw) | $NaHCO_3$ | $NaHCO_3$ | $Na_2CO_3$ | $Na_2CO_3$ | NaOH | KOH | AcONa | $NaHCO_3$ | $NaHCO_3$ |
| | 7 | 35 | 7 | 35 | 7 | 7 | 7 | 7 | 7 |
| pH of composition | 8.4 | 8.6 | 9.7 | 10.4 | 11.1 | 10.9 | 7.8 | 8.3 | 8.4 |
| Properties | | | | | | | | | |
| Appearance | ○ | ○ | ○ | ○ | ○ | ○ | ○ | ○ | ○ |
| Pencil hardness | H | H | H | H | H | H | F | H | H |
| Adhesion | 100/100 | 100/100 | 100/100 | 100/100 | 100/100 | 100/100 | 100/100 | 100/100 | 100/100 |
| Weather resistance | ○ | ○ | ○ | ○ | ○ | ○ | Δ | ○ | ○ |
| Chemical resistance | ○ | ○ | ○ | ○ | ○ | ○ | ○ | ○ | ○ |
| Solvent resistance | ○ | ○ | ○ | ○ | ○ | ○ | Δ | ○ | ○ |

KBM-503: 3-methacryloxyproply trimethoxysilane
KBM-502: 3-methacryloxypropyl methyldimethoxysilane Although some preferred embodiments have been described, many modifications and variations may be made thereto in the light of the above teachings. It is therefore to be understood that within the scope of the appended claims, the invention may be practiced otherwise than as specifically described.

What is claimed is:

1. A silicone resin-containing emulsion composition comprising an emulsion polymerized product obtained from a solution containing as the main components:

(1) 100 parts by weight of a water-insoluble silanol group-bearing silicone resin of the following average compositional formula (1):

$$R^1{}_m R^2{}_n Si(OH)_p(OX)_q O_{(4-m-n-p-q)/2} \quad (1)$$

wherein $R^1$ is an unsubstituted monovalent hydrocarbon group, $R^2$ is a monovalent hydrocarbon group substituted by (i) a halogen atom, (ii) an epoxy functional group, (iii) a (meth)acryl functional group, (iv) an amino functional group, (v) a sulfur-containing functional group, (vi) an alkyl ether functional group, (vii) a (polyoxyalkylene)alkyl ether group, (viii) a carboxyl, sulfonyl or other anionic group or (ix) a quaternary ammonium salt structure-containing group, OX is a hydrolyzable group where X is a monovalent hydrocarbon group, letters m, n, p and q are numbers satisfying $0.5 \leq m \leq 1.8$, $0 \leq n \leq 1.0$, $0 < p \leq 1.5$, $0 \leq q \leq 0.5$, $0.5 \leq m+n \leq 1.8$, and $0 < p+q \leq 1.5$, and (2) 10 to 1,000 parts by weight of a radical polymerizable vinyl monomer containing 0.01 to 10 mol % of a hydrolyzable silane having a vinyl polymerizable functional group represented by the following formula (2):

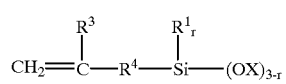

$$(2)$$

wherein $R^1$ and X are as defined above, $R^3$ is hydrogen or methyl, $R^4$ is a divalent organic group, and letter r is equal to 0, 1 or 2, said solution being substantially free of an organic solvent having a boiling point of less than 100° C., an organic solvent which is insoluble or not uniformly dispersed in water, and an aromatic organic solvent.

2. The composition of claim 1 wherein the amount of the organic solvent is 0 to 5 parts by weight per 100 parts by weight of components (1) and (2) combined.

3. The composition of claim 1 wherein the content p of the silanol group per silicon atom is 0.05 to 0.8.

4. The composition of claim 1 wherein in the water-insoluble silanol group-bearing silicone resin, the content of methyl in all the organic substituent groups ($R^1+R^2$) is at least 80 mol %.

5. The composition of claim 1 further comprising at least one pigment selected from the group consisting of an extender pigment, a coloring pigment and a corrosion-preventing pigment.

6. The composition of claim 1 further comprising a water-dispersible organic resin, a water-soluble organic resin or a mixture thereof.

7. An article having formed thereon a cured film of the composition of claim 1.

8. An article having formed thereon a cured film of a composition comprising as main components:

(A) an emulsion polymerized product obtained from a solution containing (1) 100 parts by weight of a water-insoluble silanol group-bearing silicone resin of the following average compositional formula (1):

$$R^1{}_m R^2{}_n Si(OH)_p(OX)_q O_{(4-m-n-p-q)/2} \quad (1)$$

wherein $R^1$ is an unsubstituted monovalent hydrocarbon group, $R^2$ is a monovalent hydrocarbon group substituted by (i) a halogen atom, (ii) an epoxy functional group, (iii) a (meth)acryl functional group, (iv) an amino functional group, (v) a sulfur-containing functional group, (vi) an alkyl ether functional group, (vii) a (polyoxyalkylene)alkyl ether group, (viii) a carboxyl, sulfonyl or other anionic group or (ix) a quaternary ammonium salt structure-containing group, OX is a hydrolyzable group where X is a monovalent hydrocarbon group, letters m, n, p and q are numbers satisfying $0.5 \leq m < 1.8$, $0 \leq n \leq 1.0$, $0 < p \leq 1.5$, $0 \leq q \leq 0.5$, $0.5 \leq m+n \leq 1.8$, and $0 < p+q \leq 1.5$, and (2) 10 to 1,000 parts by weight of a radical polymerizable vinyl monomer containing 0.01 to 10 mol % of a hydrolyzable silane having a vinyl polymerizable functional group represented by the following formula (2):

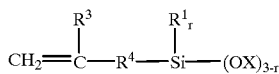
(2)

wherein $R^1$ and X are as defined above, $R^3$ is hydrogen or methyl, $R^4$ is a divalent organic group, and letter r is equal to 0, 1 or 2, and (B) a film-forming assistant having a boiling point of at least 100° C. and soluble or uniformly dispersible in water.

9. A silicone resin-containing emulsion composition comprising (A) an emulsion polymerized product according to claim 1, and (C) a compound containing a IA group and/or IIA group metal.

10. The composition of claim 9 wherein 0.001 to 20 parts by weight of the compound containing a IA group and/or IIA group metal (C) is present per 100 parts by weight of components (1) and (2) combined and the pH of the composition is in a range of 8 to 12.

11. The composition of claim 9 wherein the compound (C) is an inorganic salt.

12. The composition of claim 10 wherein the compound (C) contains Li, Na, K or Cs.

13. The composition of claim 12 wherein the compound (C) is selected from the group consisting of sodium carbonate, potassium carbonate, sodium bicarbonate and potassium bicarbonate.

14. An article having formed thereon a cured film of the composition of claim 9.

15. A method of preparing an article comprising the steps of:

forming a film of the composition of claim 9 on a substrate, and curing the film at room temperature.

16. The composition of claim 1, wherein the substituent for the $R^2$ group in formula (1) is a trifluoropropyl, perfluorobutylethyl, perfluorooctylethyl, 3-chloropropyl, 2-(chloromethylphenyl)ethyl, 3-glycidyloxypropyl, 2-(3,4-epoxycyclohexyl)ethyl, 5,6-epoxyhexyl, 9,10-epoxydecyl, 3-(meth)acryloxypropyl, (meth)acryloxymethyl, 11-(meth)acryloxyundecyl, 3-aminopropyl, N-(2-aminoethyl)-aminopropyl, 3-(N-phenylamino)propyl, 3-dibutylaminopropyl, 3-mercaptopropyl, 2-(4-mercaptomethylphenyl)ethyl, polyoxyethylenoxypropyl, 3-hydroxycarbonylpropyl, or 3-tributylammoniumpropyl group.

17. The composition of claim 1, wherein the composition has a total amount of organic solvent with a boiling point of less than 100° C., organic solvent which is insoluble or not uniformly dispersed in water and aromatic organic solvent, of 0 to 2 parts by weight per 100 parts by weight of the silanol group-bearing silicone resin and radical polymerizable vinyl monomer combined.

* * * * *